United States Patent [19]
Hashimoto et al.

[11] Patent Number: 5,711,739
[45] Date of Patent: Jan. 27, 1998

[54] PLANETARY GEAR TRANSMISSION SYSTEM

[75] Inventors: Koichi Hashimoto; Akihiro Ishibashi; Ichiro Kishi, all of Hikone; Yosuke Ishida, Yasu-gun; Hidenori Shimizu, Hikone, all of Japan

[73] Assignee: Matsushita Electric Works, Ltd., Kadoma, Japan

[21] Appl. No.: 518,508

[22] Filed: Aug. 23, 1995

[30] Foreign Application Priority Data

Aug. 26, 1994 [JP] Japan .................................. 6-202506
Apr. 25, 1995 [JP] Japan .................................. 7-100844

[51] Int. Cl.$^6$ .................................................. F16H 3/44
[52] U.S. Cl. ........................ 475/254; 475/263; 475/269; 475/338
[58] Field of Search .................................. 475/318, 290, 475/291, 331, 338, 339, 341, 154, 155, 156, 254, 263, 269

[56] References Cited

U.S. PATENT DOCUMENTS

| | | | |
|---|---|---|---|
| 3,125,901 | 3/1964 | Norton | 74/789 |
| 3,631,741 | 1/1972 | Kelbel et al. | 74/781 |
| 3,904,005 | 9/1975 | Husmann | 192/45 |
| 3,960,035 | 6/1976 | Workman, Jr. et al. | 475/318 X |
| 4,215,593 | 8/1980 | Shono et al. | 475/290 X |
| 4,255,987 | 3/1981 | Ciolli | 475/290 X |
| 4,364,286 | 12/1982 | Ciolli | 475/291 X |
| 4,691,786 | 9/1987 | Fujita et al. | 475/318 X |
| 5,171,195 | 12/1992 | Funamoto | 475/318 X |
| 5,279,527 | 1/1994 | Crockett | 475/291 X |
| 5,295,925 | 3/1994 | Hirabayashi | 475/331 |
| 5,397,282 | 3/1995 | Weidman | 475/318 X |
| 5,409,430 | 4/1995 | Hashimoto et al. | 475/331 |

FOREIGN PATENT DOCUMENTS

| | | |
|---|---|---|
| 1 625 825 | 9/1966 | Germany . |
| 35 23 078 A1 | 6/1985 | Germany . |
| 35 29 992 A1 | 8/1985 | Germany . |
| 2 172 674 | 9/1986 | United Kingdom . |

OTHER PUBLICATIONS

German Patent Office Action for German Patent Application No. 195 31 043.8 dated Dec. 20, 1996 with translation.

*Primary Examiner*—Khoi Q. Ta
*Assistant Examiner*—Peter T. Kwon
*Attorney, Agent, or Firm*—Armstrong, Westerman, Hattori, McLeland & Naughton

[57] ABSTRACT

A planetary gear transmission gear system comprises a main planetary gear train composed of a main sun gear, a main ring gear, and main planet gears. The main sun gear is driven by an input rotary shaft to rotate. A sub planetary gear train is included to have a sub sun gear, a sub ring gear, and sub planet gears, and has a different gear ratio from the main planetary gear train. The sub sun gear is connected to rotate together with the main sun gear. A common carrier supporting the main and sub planet gears is rotatable about a common center axis and is drivingly connected to rotate an output shaft. A lock mechanism releasably fixes the main ring gear in order to allow the main planet gears to rotate about the center axis as the main sun gear rotates with the main ring gear fixed. A one-way clutch is connected to permit the sub ring gear to rotate in a first direction and to prohibit the sub ring gear from rotating in a second direction opposite to the first direction. The first direction is selected to be a direction in which the sub ring gear is permitted to rotate while the carrier rotates with the main ring gear fixed by the lock mechanism such that the sub ring gear is locked in the second direction after the main ring gear is released, thereby permitting the carrier to continue rotating at a speed reduction ratio different than when the main ring gear is fixed.

27 Claims, 13 Drawing Sheets

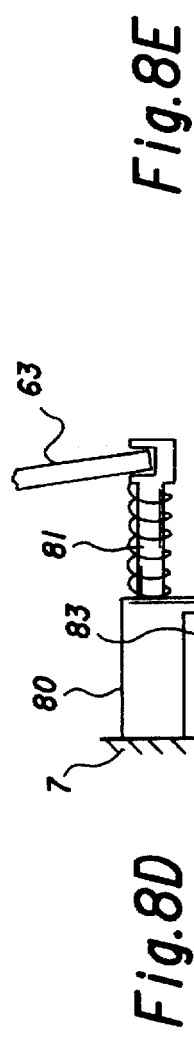
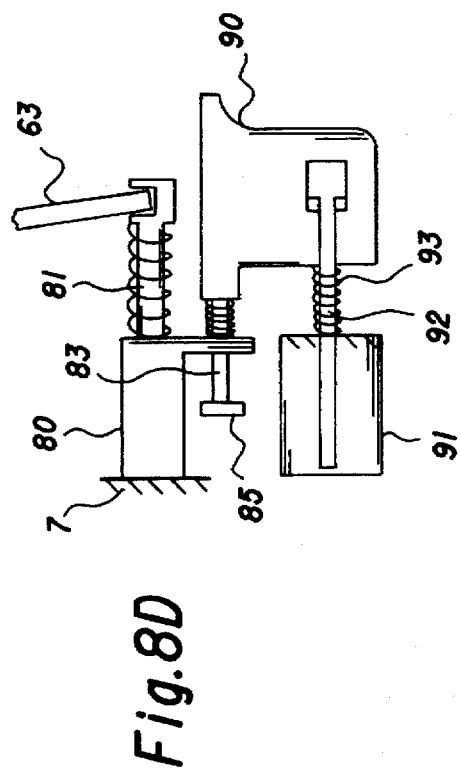
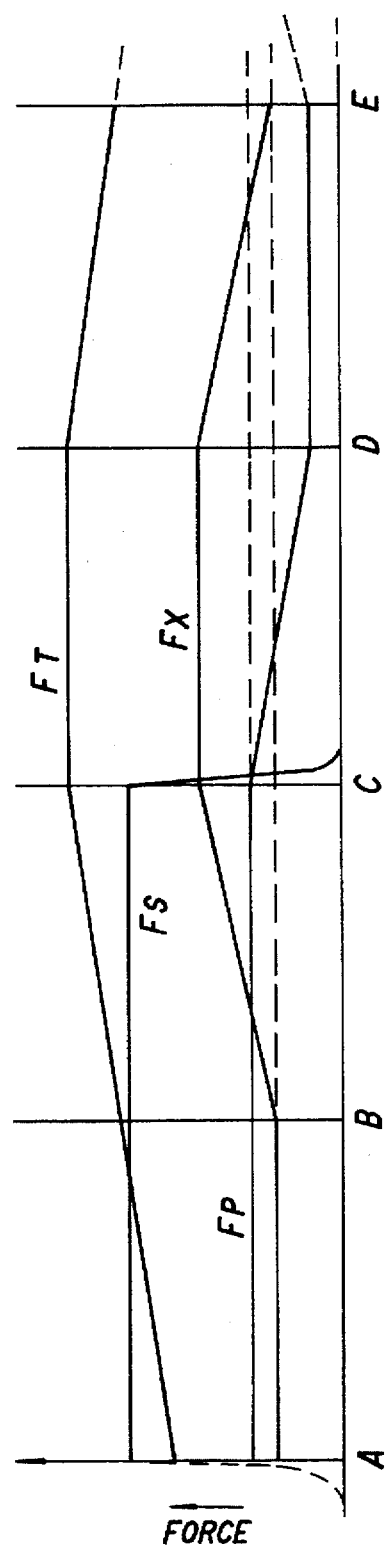
Fig.8E
Fig.8D
Fig.9

PLANETARY GEAR TRANSMISSION SYSTEM

THE INVENTION

1. Field of the Invention

The present invention is directed to a planetary gear transmission system, and more particularly to such a system capable of changing a speed reduction ratio.

2. Description of the Prior Art

Japanese Patent Early Publication (KOKAI) No. 63-101545 discloses a planetary gear transmission system capable of changing a speed reduction ratio. The system comprises main and sub planetary gear trains each of which is composed of a sun gear, a ring gear, and planet gears and has a different speed reduction ratio from each other. The sun gears of the main and sub gear trains are connected to a rotating input shall to rotate together therewith to drive the planet gears of the main and sub planetary gear trains. The planet gears of the main and sub gear trains are coupled to a common carrier which is connected to drive an output shaft. A speed changer is provided to engage a lock member selectively with the ring gear of one of the main and sub gear trains to relatively fix that ring gear for rotating the planetary gears belonging to one of the main and sub gear trains of which ring gear is fixed, thereby rotating the common carrier and therefore the output shaft at a reduction ratio determined by one of the main and sub gear trains of which ring gear is fixed. While one of the main and sub gear trains has its ring gear fixed, the ring gear of the other gear train is kept rotating. Therefore, changing of the reduction gear ratio requires to stop the rotating ring gear forcibly by engaging the leek member therewith, which causes the mechanical collision between the rotating ring gear and the lock member. This collision brings about undue vibrations and noises, and also wearing of the ring gear and the lock member which eventually reduce the operating life of the gear transmission system.

SUMMARY OF THE INVENTION

The above problem has been reduced in the present invention which provides an improved planetary gear transmission system. The system comprises a main planetary gear train composed of a main sun gear, a main ring gear coaxial with the main sun gear, and main planet gears meshing with the main sun gear and the main ring gear. The main sun gear is adapted in use to be connected to an input rotary shaft to be driven thereby to rotate. A sub planetary gear train is included to be composed of a sub sun gear, a sub ring gear coaxial with the sub sun gear, and sub planet gears meshing with the sub sun gear and the sub ring gear The sub planetary gear train has a different gear ratio from the main planetary gear train. The sub sun gear is connected to the main sun gear to rotate together therewith. A common carrier is provided to support the main and sub planet gears and is rotatable about a common center axis of the main and sub sun gears. The common carrier is adapted in use to be drivingly connected to rotate an output shaft. A lock mechanism is included to releasably fix the main ring gear in order to allow the main planet gears to rotate about the center axis as the main sun gear rotates while the main ring gear is rotatively fixed. A one-way clutch is connected to the sub ring gear to permit the sub ring gear to rotate in a first direction and to prohibit the sub ring gear from rotating in a second direction opposite to the first direction. The first direction is selected to be a direction in which the sub ring gear is permitted to rotate during the common carrier rotates with the main ring gear fixed by the lock mechanism such that the sub ring gear is locked in the second direction after the main ring gear is released to thereby permit the common carrier to continue rotating at a speed reduction ratio different than when the main ring gear is fixed. Thus, while the main ring gear is rotatively fixed by the lock mechanism, the rotation of the main and sub sun gears causes the main planet gears to rotate together with the common carrier about the center axis during which the sub ring gear is permitted by the one-way clutch to rotate freely in the first direction, thereby rotating the output shaft at a main speed reduction ratio determined by the main planetary gear train. When the main ring gear is released to rotate freely while the carrier is rotating, the continuously rotating sub sun gear act to rotate the sub ring gear through the sub planet gears in the second direction. At this condition, the one-way clutch is operative to prohibit the sub ring gear from rotating in the second direction, therefore allowing the sub planet gears to rotate together with the carrier to continue rotating in the same direction but at a sub speed reduction ratio determined by the sub planetary gear train. With the provision of the one-way clutch, releasing of the main ring gear can automatically cause the sub ring gear to be rotatively fixed in the direction of allowing the carrier to continue rotating without accompanying substantial collision between the sub ring gear and the lock mechanism that results in noises, vibrations and wearing of the components.

Accordingly, it is a primary object of the present invention to provide a planetary gear transmission system which eliminates noise, vibration and wearing of the components at the time of changing the speed reduction ratio.

The main and sub planetary gear trains are configured such that the carrier rotates at a higher speed reduction ratio with the sub ring gear being fixed than with the main ring gear being fixed. This configuration is particularly useful when the planetary gear transmission system is utilized in a power tool such as a drill in which an increased output torque is given by releasing the main ring gear after rotating the output shaft with the main ring gear fixed.

In a preferred embodiment, the one-way clutch includes a direction switch mechanism for switching the first and second directions so that the planetary gear transmission system work in either rotating direction of the input shaft.

In order to achieve the switching of the first and second directions, the one-way clutch comprises a fixed outer race, an inner race integral with the sub ring gear, and rollers held in a circumferentially extending space between the outer and inner races. The direction switch mechanism comprises a switch member received in the space to be movable circumferentially between two opposite first and second positions. The switch member divides the space circumferentially into two opposite compartments each of which receives the roller and has a varying gap between the inner and outer races. The gap is made smaller towards the switch member to define a lock end of the compartment adjacent the switch member and a release end of the compartment opposite to the lock end. The lock end has a gap smaller than the diameter of the roller and the release end has a gap greater than the diameter of the roller. The roller is movable circumferentially in each compartment and urged against the switch member such that the roller in one of the compartments is displaced into the lock end to permit the inner race to rotate only in the first direction when the switch member is moved to the first position, and that the roller in the other compartment is displaced into the lock end to permit the inner race to rotate only in the second direction when the switch member is moved to the second position.

In another embodiment, the system includes an additional sub ring gear meshing with the sub planet gears in a coaxial relation with the sub ring gear, and further includes a second one-way clutch which is connectable to the additional sub ring gear to permit the additional sub ring to rotate only in the second direction. A selector is provided to selectively actuate the first and second one-way clutches in accordance with the rotating direction of the input shaft. Therefore, the system of this embodiment can be adapted to rotate the output shaft in either direction simply by selectively actuating one of the first and second one-way clutches.

The lock mechanism is movable from a lock position of fixing the main ring gear to release position of releasing the main ring gear, and is actuated to move into the release position in response to the main ring gear receiving a load which exceeds a predetermined level. With this arrangement, the speed reduction ratio can be made automatically with the increasing lead applied to the main ring gear as representative of the output lead.

Additionally or alternatively, a release handle is connected to manually move the lock mechanism into the release position.

Further, an electromagnetic actuator may be included in the system to be connected to move the lock mechanism into the release position in response to an electrical signal issued from a lead sensor when a lead applied to the output shaft is sensed to exceed a predetermined level. Preferably, the electromagnetic actuator comprises a keep solenoid with a plunger connected to move the lock mechanism.

The keep solenoid is actuated upon energized by an electric current to move the lock mechanism into the release position and holding it in the lock position in the absence of the electric current. For this purpose, the keep solenoid includes a permanent magnet attracting the plunger in the direction of holding the lock mechanism in the lock position. The plunger is urged by a spring in the direction of moving the lock mechanism to the release position against the magnetic attraction of the permanent magnet and is held in the release position by the spring after the lock mechanism moves to this position. With the use of such keep solenoid, the actuator is required to be energized only at the time of moving the lock mechanism into the release position, thereby minimizing the power requirement for operation of the actuator.

These and still other objects and advantageous features of the present invention will become more apparent from the following description of the embodiments when taken in conjunction with the attached drawings.

BRIEF DESCRIPTION OF THE DRAWINGS

FIGS. 8A to 8E are schematic views illustrating the operation of a keep solenoid utilized in the above system;

FIG. 9 is a graph illustrating a relation of forces acting on a plunger of the keep solenoid during the operation of the power tool;

FIGS. 15A to 17A are schematic views illustrating the operation of a lock mechanism for a main ring gear of the system;

FIGS. 15B to 17B illustrate the operation of the lock mechanism in association with a trigger of the power tool, respectively corresponding the conditions of FIGS. 15A to 17A.

DETAILED DESCRIPTION OF THE EMBODIMENTS

First Embodiment <FIGS. 1 to 9>

Figure 1:
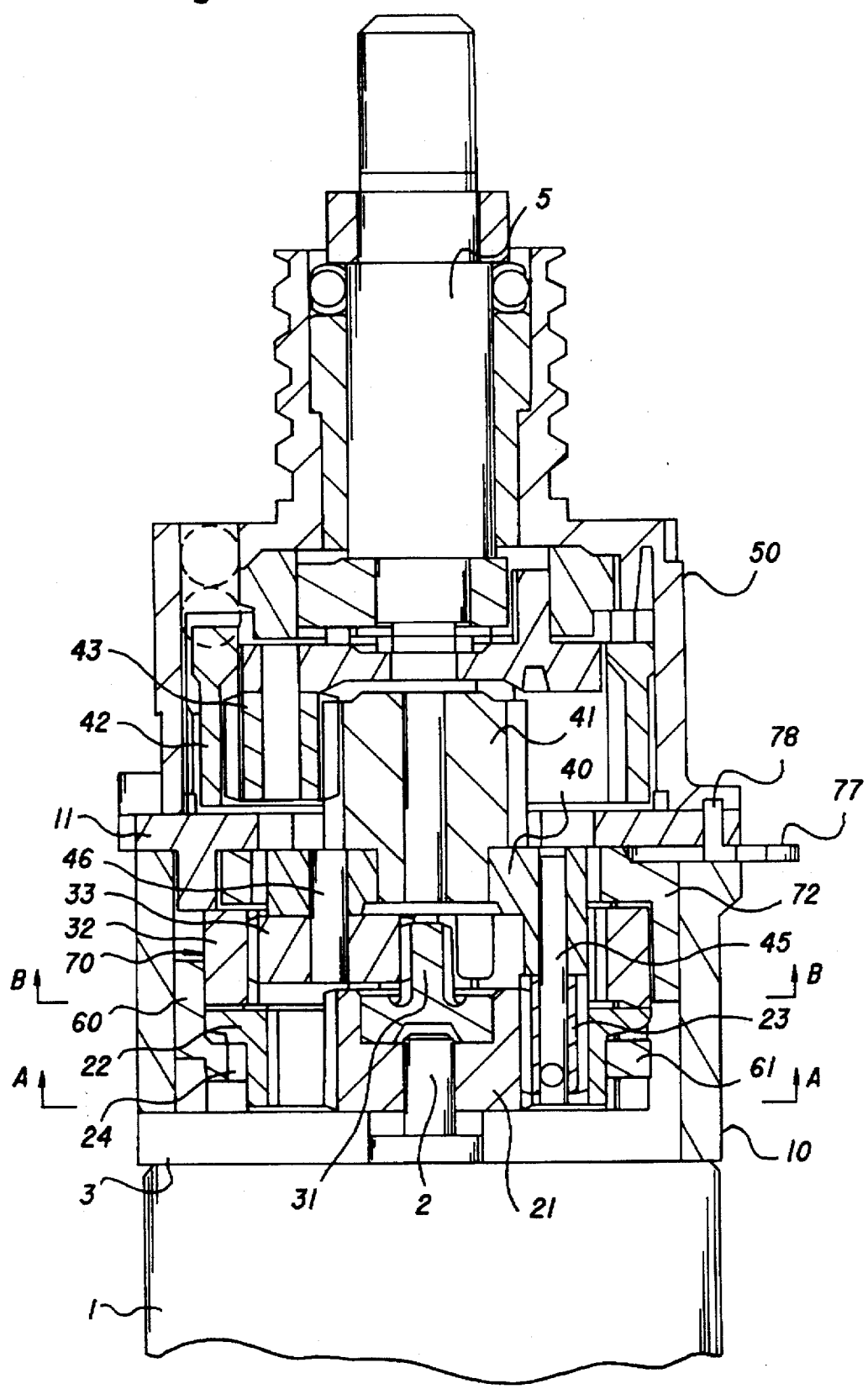
FIG. 1 is a vertical section of a planetary gear transmission system in accordance with a first embodiment of the present invention.
Figure 2:
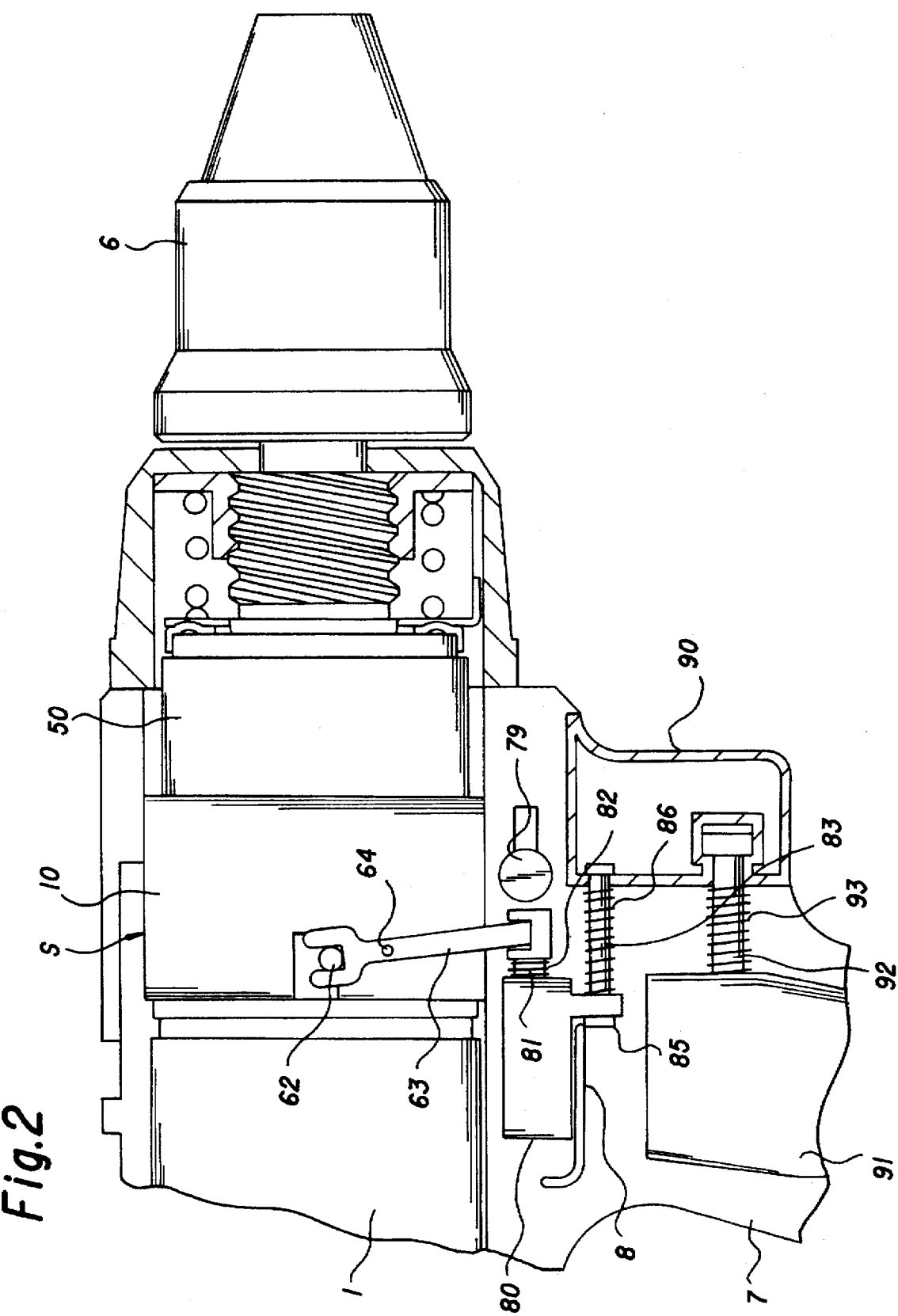
FIG. 2 is a partially sectional view of a power tool incorporating the above planetary gear transmission system.

Referring now to FIG. 1, there is shown a planetary gear transmission system in accordance with a first embodiment of the present invention. The system is adapted in use to be incorporated in a power tool to reduce the motor speed at different ratios. As shown in FIG. 2, the system S is placed between an electric motor 1 and an output shaft 5 of the power tool for driving a drill bit or screwdriver bit attached to the output shaft by mean of a chuck 6. Turning back to FIG. 1, the system comprises a cylindrical case 10 accommodating therein a main planetary gear train and a sub planetary gear train having different gear ratios from one another. The main planetary gear train is composed of a main sun gear 21, a ring gear 22 and planet gears 23 meshing with the sun gear 21 and the ring gear 22. The sub planetary gear train is composed of a sub sun gear 31, a sub ring gear 32, and sub planet gears 33 meshing with the sun gear 31 and the ring gear 33. The main sun gear 21 and the sub sun gear 31 are coaxially fixed and are connected commonly to a rotor shaft 2 of the motor 1 to be driven thereby to rotate. The motor 1 is mounted on a plate 3 coupled to a lower axial end of the case 10. The main planet gears 23 and sub planet gears 33 are commonly supported to a carrier 40 by means of pins 45 and 46. The carrier 40 is mounted on a base 11 secured to an upper axial end of the case 10 in a coaxial relation with the sung gears 21 and 31 so that the carrier 40 is rotatable about a common center axis of the gear system. The carrier 40 is drivingly connected to the output shaft 5 through another planetary gear train composed of a sun wheel 41 integrally projecting from the carrier 40, a ring wheel 42 fixed to a housing 50, and planet wheels 43 meshing with the sun wheel 41 and the ring wheel 42. The planet gears 43 are supported to another carrier 44 which is held rotatable within the housing 50 and to which the output shaft 5 is secured at its lower end. Thus, the rotation of the carrier 40 about the center axis is transmitted to rotate the output shaft 5.

Change of the speed reduction ratio is made by selectively fixing one of the main ring gear 22 and the sub ring gear 32 while allowing the other ring gear to rotate freely. For this purpose, a lock ring 60 is connected to releasably fix the main ring gear 22 to the case 10 and a one-way clutch 70 is connected to permit the sub ring gear 32 to rotate in one direction and prohibit it from rotating in the other direction. When the main ring gear 22 is fixed, the rotation of the main sun gear 21 causes the carrier 40 to rotate in the same direction with the sub ring gear 32 allowed by the one-way clutch to rotate freely, thereby rotating the output shaft 5 at a speed reduction ratio determined by the main planetary gear train. When on the other hand, the main ring gear 22 is released, the one-way clutch 70 comes into operation of fixing the sub ring gear 32 so that the rotation of the sub sun gear 31 causes the carrier 40 to rotate in the same direction, thereby rotating the output shaft 5 at another speed reduction ratio determined by the sub planetary gear train. The main sun gear 21 has a diameter larger than the sub sun gear 31 and the main planet gear 23 has a diameter smaller than the sub planet gear 33 so that the carrier 40 rotates at a lower speed reduction ratio, i.e., at a higher speed with lower torque when the main ring gear 22 is fixed than when the sub ring gear 32 is fixed.

Figure 3:
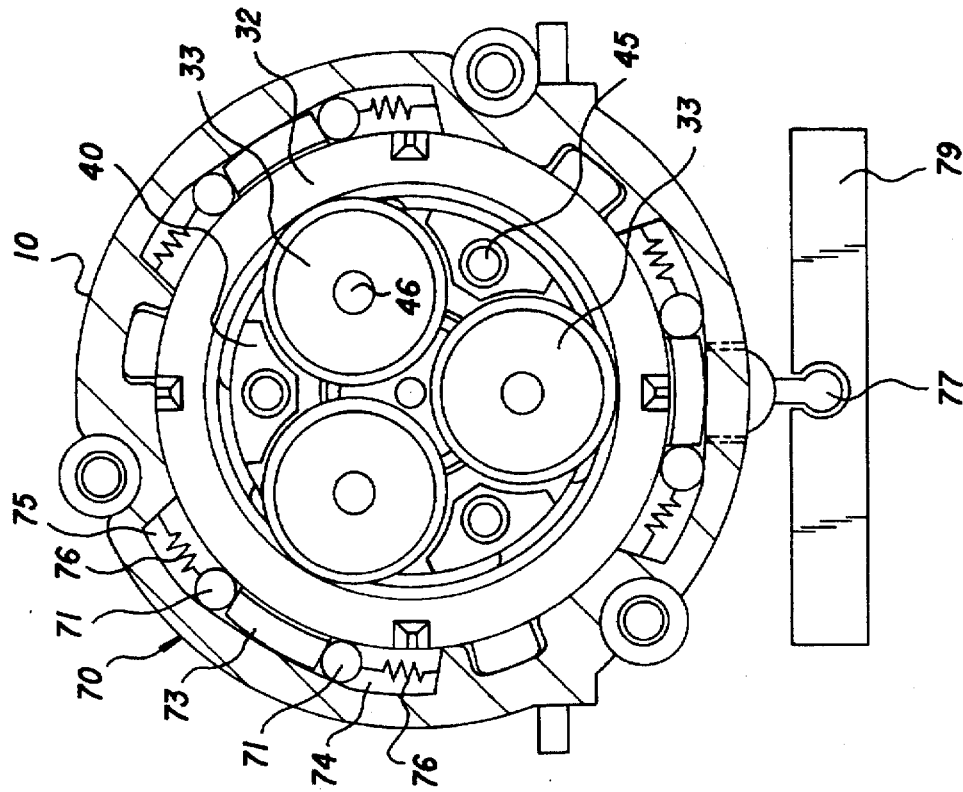
FIG. 3 is a cross section taken along line A—A of FIG. 1 with some parts removed.
Figure 5:
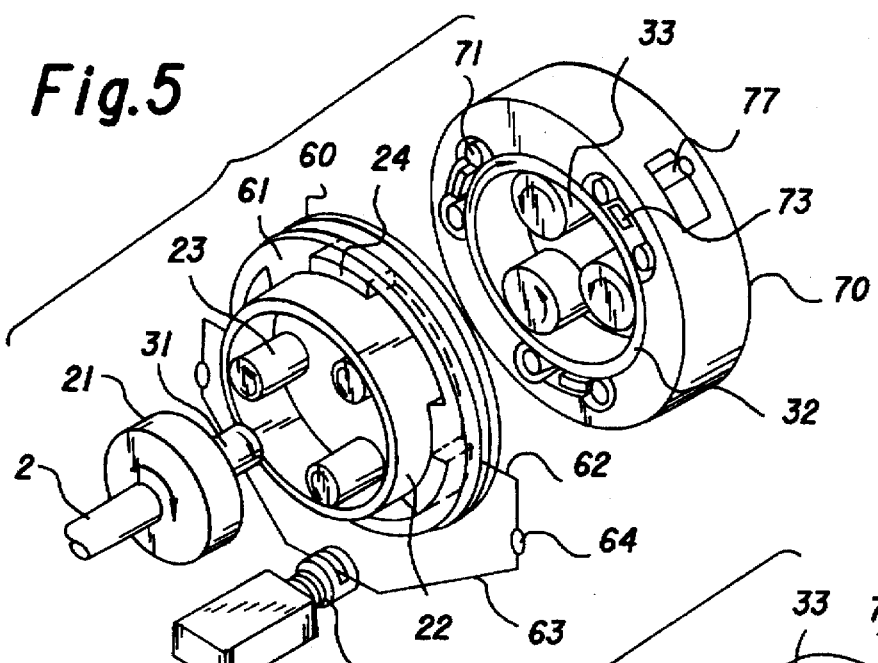
FIG. 5 is an exploded perspective views illustrating the operation of the system with a main ring gear being rotatively fixed.
Figure 6:
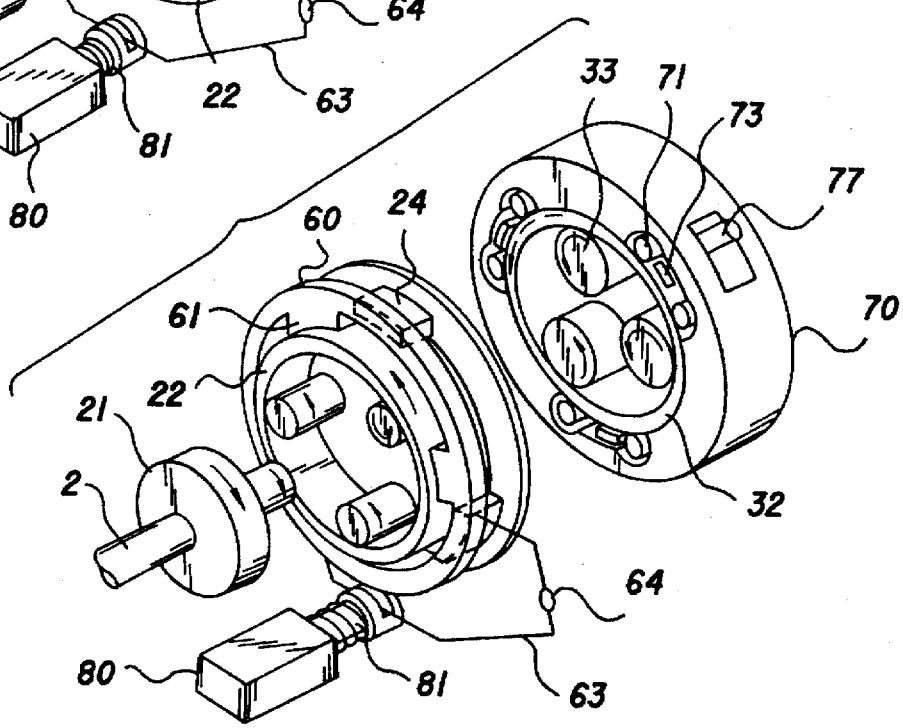
FIG. 6 is an exploded perspective views illustrating the operation of the system with the main ring gear being released.
Figure 7:
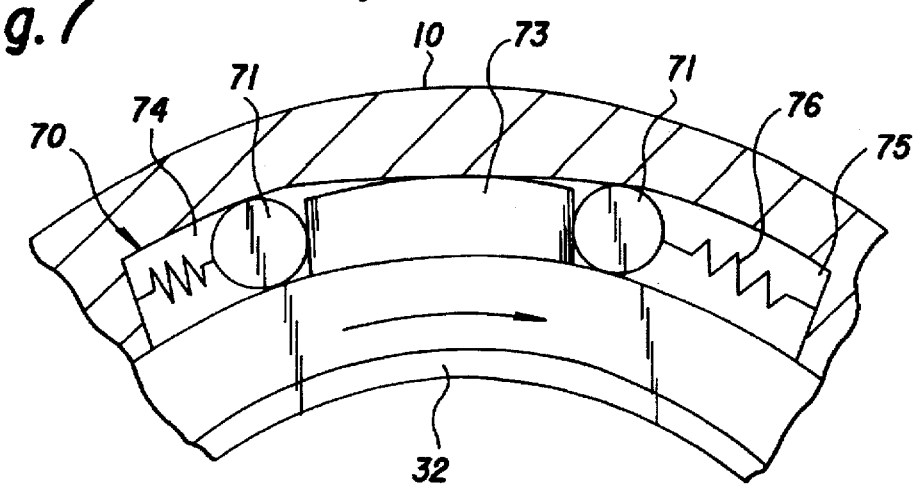
FIG. 7 is a sectional view of a portion of a one-way clutch for illustrating the switching operation thereof.

As shown in FIG. 3, the lock ring 60 is formed on its interior surface with circumferentially spaced stoppers 61 which are engageable with projections 24 formed on the outer perimeter of the main ring gear 22 in a circumferentially spaced relation. The lock ring 60 is held within the case 10 to be axially movable between a lock position of engaging the stoppers 61 with the projections 24, as seen in FIGS. 1 and 5, to fix the main ring gear 22 and a release position of disengaging the stoppers 61 from the projections 24, as shown in FIG. 6, to release the main ring gear 22. The lock ring 60 has a pair of diametrically opposed arms 62 extending outwardly of the case 10 and connected to one end of a lever 63 which is pivotally supported to the case 10 by pins 64. The other end of the lever 63 is connected to a keep solenoid 80 so that the lever 63 is driven thereby to move the lock ring 60 from the lock position to the release position upon energization of the solenoid, as will be discussed later.

Figure 4:
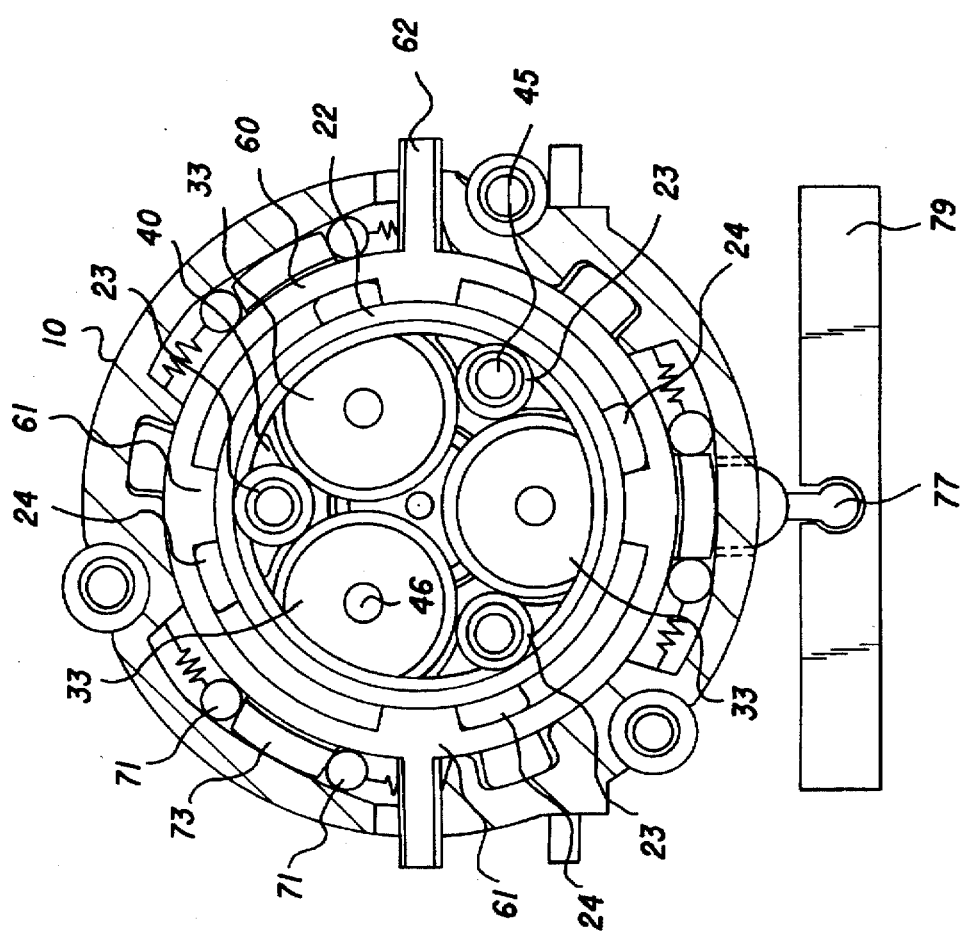
FIG. 4 is a cross section taken along line B—B of FIG. 1 with some parts removed.

The one-way clutch 70 comprises, as shown in FIGS. 1 and 4, an inner race defined by the sub ring gear 32, an outer race defined by the case 10, rollers 71 received in spaces formed between the inner and outer races, and a switcher ring 72 with circumferentially spaced sliders 73. Each of the sliders 73 extends into the space between the inner and outer races to divide it into first and second compartments 74 and 75 each receiving one roller 71 and a spring 76 biasing the roller 71 towards the slider 73. Each compartment is configured to provide a lock end adjacent the slider 73 and a release end opposite to the slider 73. The lock end has a narrowing gap which is defined by an inclined surface of the outer race 10 and which becomes smaller than the diameter of the roller 71 so that the roller at the lock end is prohibited to rotate. The release end has a gap which is greater than the diameter of the roller 71 so that the roller 71 at the release end is permitted to freely rotate. When the switcher ring 72 is turned by sonic angle to displace the sliders 73 from a neutral position of FIG. 4 to a first is position of FIG. 7, the roller 71 in the first compartment 74 moves to the release end and the roller 71 in the second compartment 75 moves to the lock end so that the inner race, i.e., the sub ring gear 32 is permitted to rotate in the first direction as indicated by an arrow in FIG. 7 and is prohibited from rotating in the second direction opposite to the first direction. When, on the other hand, the switcher ring 72 is turned in the opposite direction to displace the sliders 73 to a second position of moving the roller in the first compartment 74 to the lock end and the roller 71 in the second compartment 75 to the release end, the sub ring gear 32 is permitted to rotate in the second direction and prohibited from rotating in the first direction. In this manner, the one-way clutch 70 can switch the direction in which the sub ring gear 32 is permitted to rotate by changing the turning direction of the switcher ring 72. The switcher ring 72 is connected through a lever 77 to a rod 79 by which the rotatable direction of the one-way clutch 70 is switched. In this sense, the rod 79 defines a direction selector and is operatively associated with a motor circuit of determining the rotating direction of the motor so as to select the rotatable direction of the one-way clutch depending upon the motor rotating direction for enabling the sub planetary gear train to operate when the main ring gear 21 is fixed. The lever 77 is pivotally supported by a pin 78 to the base 11 of the case 10.

At the start of rotating the motor, i.e., operating the power tool, the lock ring 60 is kept in the lock position of fixing the main ring gear 22, as shown in FIG. 5. In this condition, the main planetary gear train is made active to rotate the carrier 40 and therefore the output shaft 5 in the same direction as the motor, while the one-way clutch 70 permits the sub ring gear 32 to freely rotate to thereby leave the sub planetary gear train inactive. Thus, the motor rotation is transmitted to rotate the output shaft 5 at a high speed with low torque. During the motor rotation, a lead sensor (not shown) is in operation to monitor a motor current as representative of a lead being applied to the output shaft 5 and issues a signal to energize the keep solenoid 80 when the monitored motor current exceeds a predetermined level. Upon this occurrence, the keep solenoid 80 acts to move the lock ring 60 from the lock position to the release position to release the main ring gear 22, as shown in FIG. 6. In this condition, the main ring gear 22 is left to freely rotate to thereby make the main planetary gear train inactive, which in turn acts to stop rotating the carrier 40. In this response, the sub planet gears 33 continuously rotating by the sub sun gear 31 acts to rotate the sub ring gear 32 in the direction which, as indicated by dotted arrows. However, since the one-way clutch 70 prohibits the sub ring gear 32 to rotate in this direction, the sub ring gear 32 is relatively fixed to thereby make active the sub planetary gear train and therefore allow the carrier 40 to continue rotating but at the slow speed with high torque. When the motor is reversed by manipulation of the rod 79, the one-way clutch 70 responds to switch the rotatable direction of the sub ring gear 32, thus permitting the system to change the speed reduction ratio equally.

The keep solenoid 80 utilized in the above embodiment comprises, as shown in FIG. 2, a plunger 81 coupled at its one end to the lever 63 for moving the lock ring 60 between the lock position and the release position. The keep solenoid 80 is disposed in a tool housing 7 adjacent a trigger 90 of actuating the motor 1 and is held slidable along a guide 8 in a direction parallel to the direction along which the trigger 90 is pushed. The keep solenoid 80 is operatively connected to the trigger 90 by a return handle 83 which extends in a parallel relation to the plunger 81 and extends loosely through a bracket 84 of the solenoid 80. The return handle 83 is fixed at its one end to the trigger 90 and is formed at the other end with a flange 85 which engages with the bracket 84. A coil spring 86 is wound around the return handle 83 between the bracket 84 and the trigger 90. Thus, the solenoid 80 moves to a rear position as the trigger 90 is pushed and moves to a forward position as the trigger 90 returns. The plunger 81 is urged by a coil spring 82 to extend from the solenoid case for moving the lever 63 in the direction of moving the lock ring 60 to the release position. The keep solenoid 80 includes a permanent magnet (not shown) for attracting to retract the plunger 81 against the bias of the coil spring 82 to normally retain the plunger in the retracted position. The trigger 90 is connected to an electric switch 91 by means of an actuator rod 92 which is pushed by the trigger 90 against a bias of a spring 93 to energize the motor 1. The actuator rod 92 is connected to the trigger 90 while leaving such a gap G that the actuator rod 92 is pushed after the trigger 90 is pushed by a distance of the gap G.

Figure 8A:
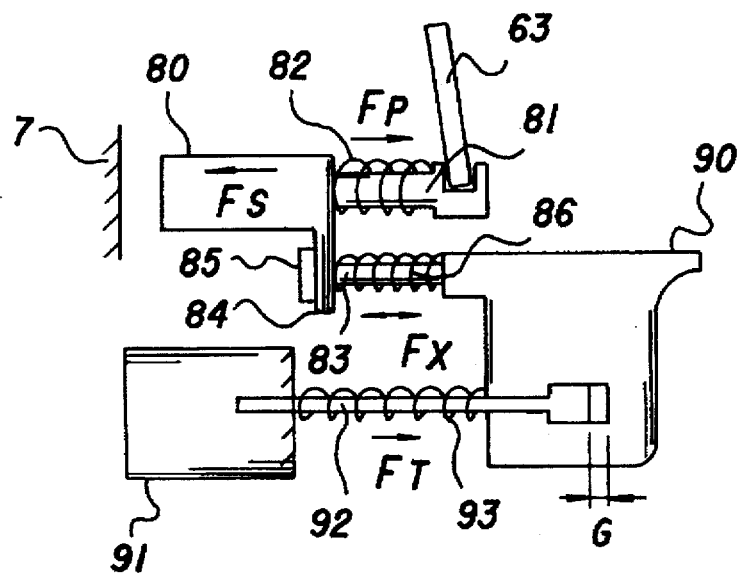
Figure 8B:
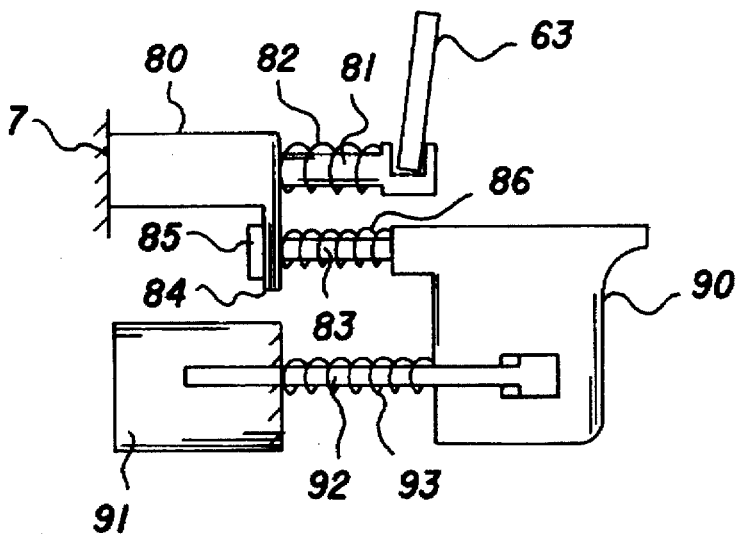
Figure 8C:
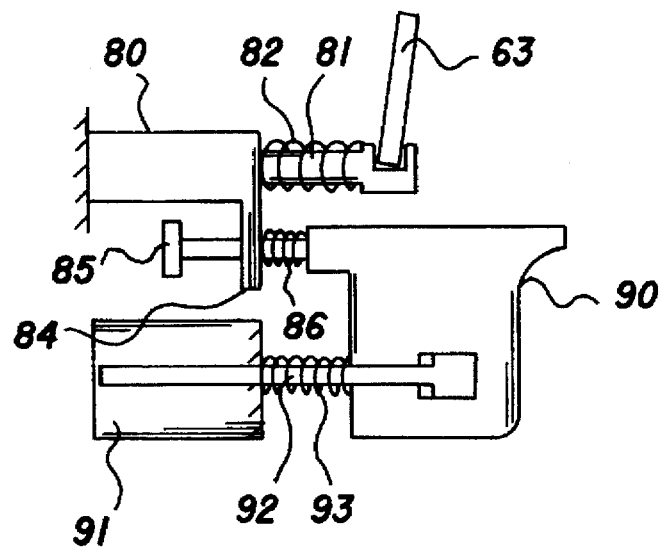

Operation of the keep solenoid 80 in association of the movement of the trigger 90 is now discussed with reference to FIGS. 8A to 8E and FIG. 9. When the trigger 90 is held at an OFF position of FIG. 8A by the bias of the spring 93, the keep solenoid 80 is held at the forward position and the plunger 81 is kept retracted to thereby hold the lever 63 in the position of keeping the lock ring 60 in the lock position of fixing the main ring gear 22. When the trigger 90 is lightly pressed by a gap distance G to a position of FIG. 8B where the actuator rod 92 remains unpressed to keep the motor unenergized, the solenoid 91 is moved to the rearward position as a result of the spring 86 pushing the bracket 84 of the solenoid 80, so that the connecting end of the lever 63 is correspondingly pulled to move the lock ring 60 in the lock position of fixing the main ring gear 22, ready for operating the power tool. Further pressing of the trigger 90 to an ON position of FIG. 8C pushes the actuator rod 92 for energizing the motor in which the solenoid 80 is held in the same position so that the output shaft is driven by the motor to rotate at the high speed determined by the main planetary gear train. When the load applied to the output shaft exceeds the predetermined level during the operation of the power tool, the solenoid 80 is energized to release the plunger 81 under the bias of the spring 82 as a result of the resulting electromagnetic force overcoming the attraction force of the permanent magnet in the solenoid, thereby urging the connected end of the lever 63 forward, as shown in FIG. 8D, to move the lock ring 60 to the release position of activating the sub planetary gear train instead of the main planetary gear train. When the trigger 90 is released to stop operating the power tool, the trigger 90 returns by the urgency of the spring 93 back to the OFF position of FIG. 8A through an intermediate position of FIG. BE, during which the solenoid 80 is moved forward as being pulled by the flange 85 of the return handle 83 against the bias of the spring 82 with the connecting end of the plunger 81 with the lever 63 kept in position to thereby retract the plunger 81 mechanically as shown in FIG. 8A where the plunger 81 is kept latched by the permanent magnet against the bias of the spring 82. FIG. 9 illustrates the relation among attraction force Fs by the permanent magnet, spring force FP by spring 82, spring force Fx by spring 86, spring force FT by spring 93 during the changing trigger positions which are designated by A, B, C, D, and E on the abscissa in corresponding to FIGS. 8A to BE. As described in the above, the lock ring 60 returns to the release position by means of the return handle 83 each time the trigger 90 is released so that the lock ring 60 is caused to move to the lock position upon initial pressing of the trigger 90 before powering the motor 1, whereby the output shaft 5 is always driven to start rotating at the speed reduction ratio determined by the main planetary gear train.

In the above embodiment, the keep solenoid 80 is arranged in combination with the plunger 61 and the lock ring 60 such that the rock ring 60 is attracted to the lock position by the permanent magnet and is urged by the spring 82 to the release position. However, it is equally possible to attract the lock ring 60 towards the release position by the permanent magnet and urge the lock ring 60 towards the lock position by a spring such that the lock ring is kept in the release position by the permanent magnet and in the lock position by the spring. In either case, the keep solenoid is energized only when the ring is required to move into the release position from the lock position, thereby minimizing the power requirement for changing the speed reduction ratio of the planetary gear transmission system during the operation of the power tool.

Second Embodiment <FIGS. 10 to 17>

Figure 10:
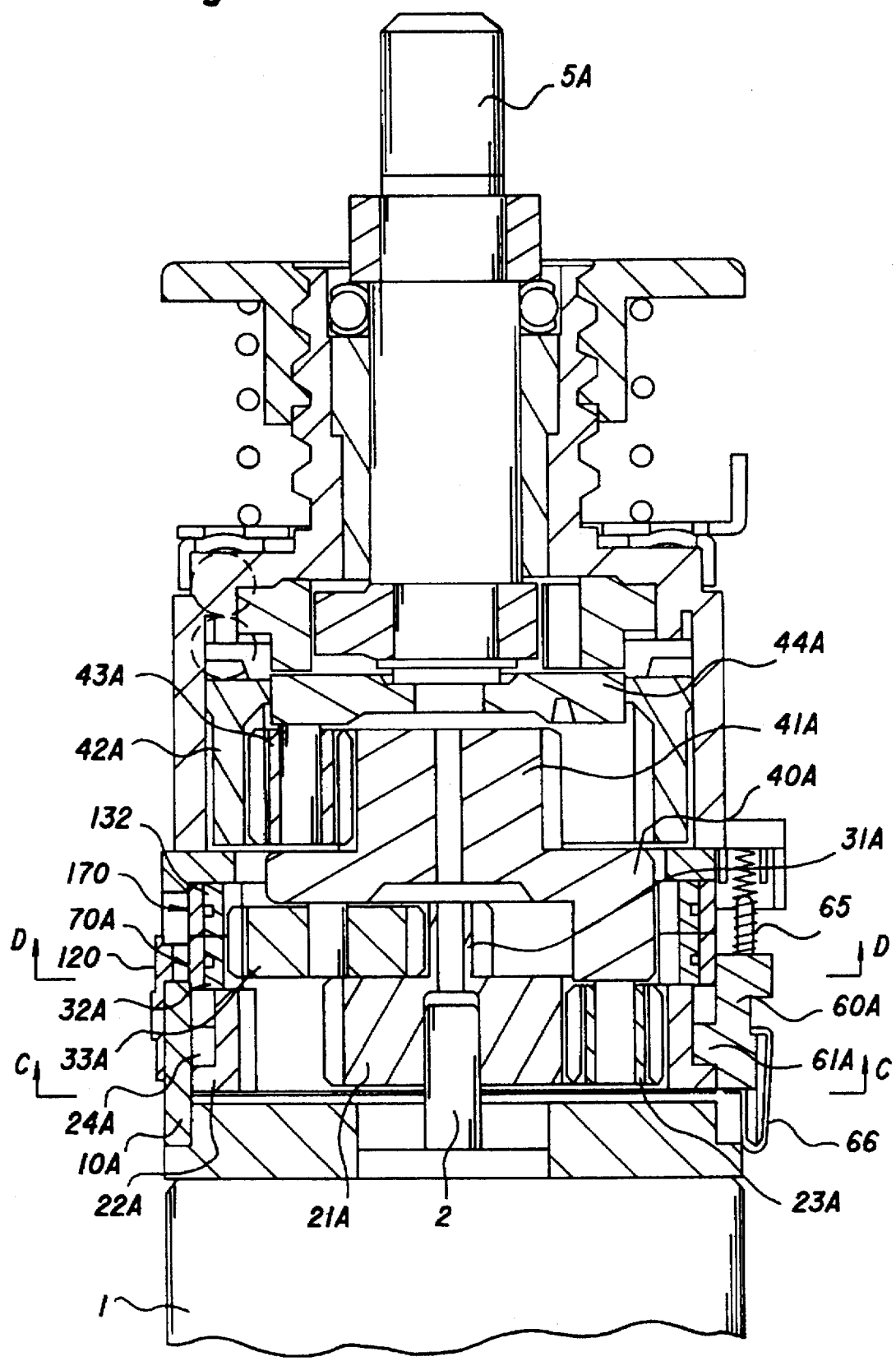
FIG. 10 is a vertical section of a planetary gear transmission system in accordance with a second embodiment of the present invention.
Figure 11:
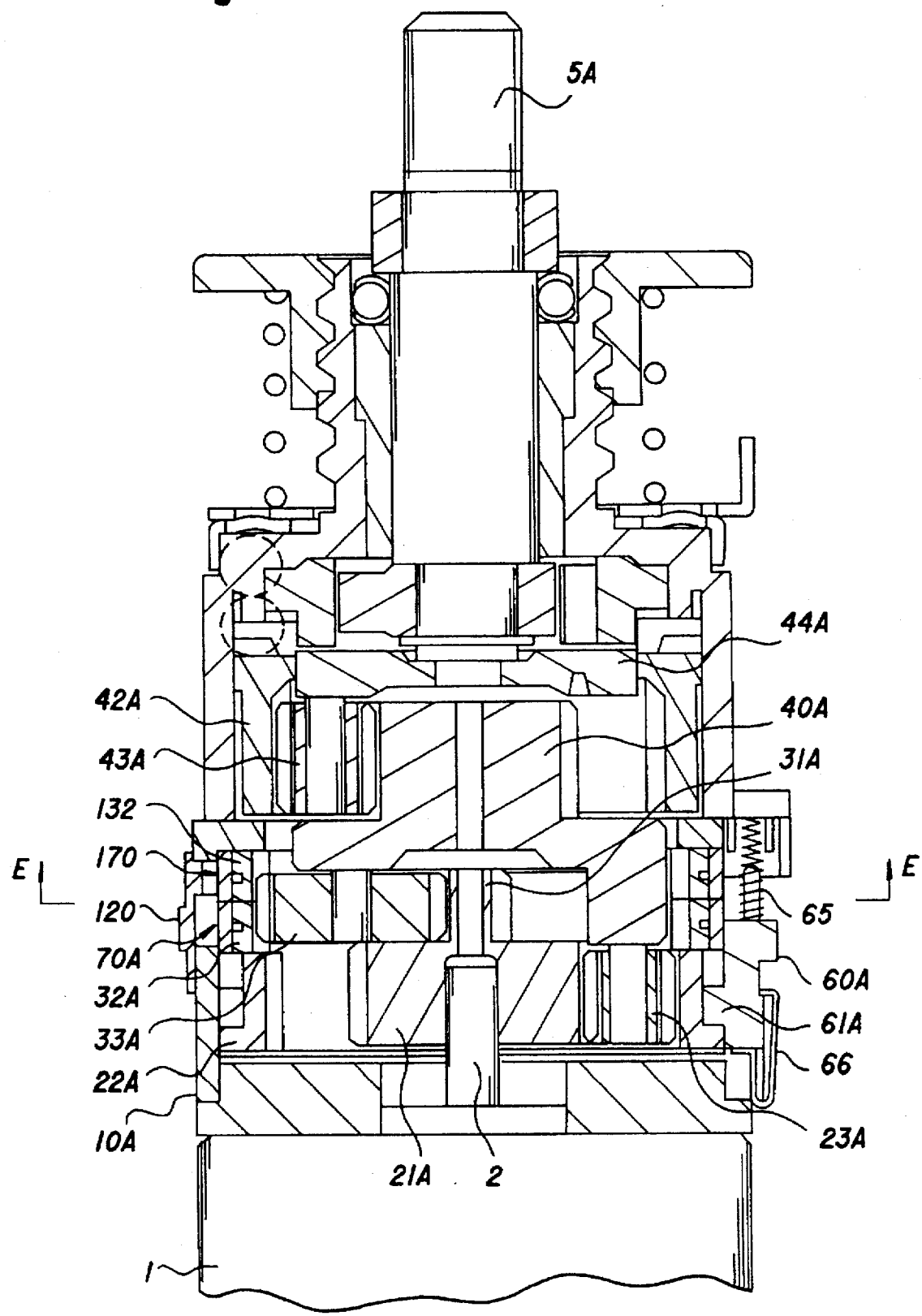
FIG. 11 is a vertical section similar to FIG. 10 but illustrating the condition for rotating an output shaft in the opposite direction.
Figure 12:
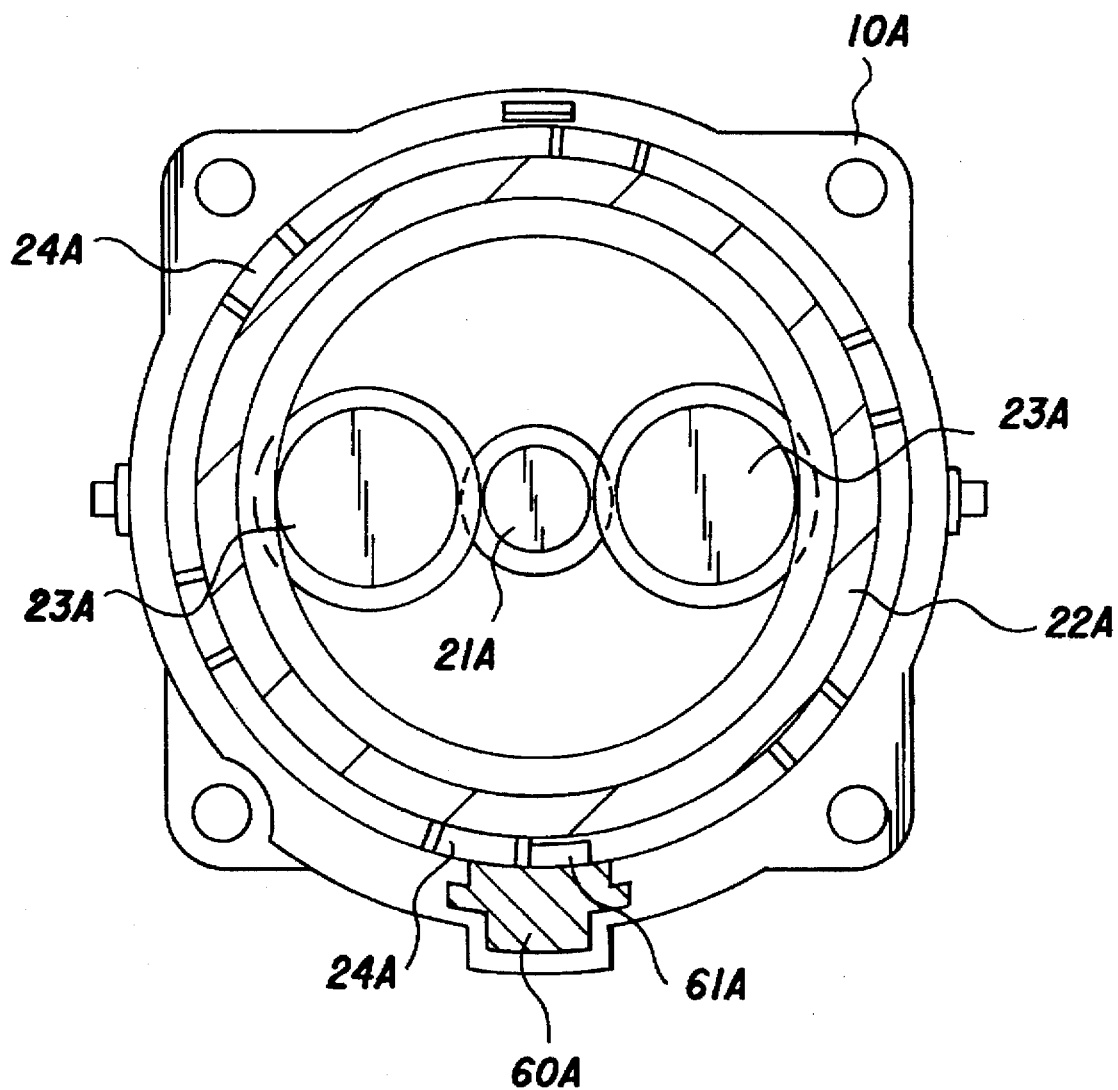
FIG. 12 is a cross section substantially taken along line C—C of FIG. 10.

Referring to FIG. 10, there is shown a planetary gear transmission system in accordance with a second embodiment of the present invention which is similar to the first embodiment except that an additional sub ring gear 132 and additional one-way clutch 170 are included in the case 10A together with the main planetary gear train and the sub planetary gear train. Like parts are designated by like numerals with a suffix letter of "A". The additional sub ring gear (hereinafter referred to as a second sub ring gear) 132 is coaxial with the sub ring gear (hereinafter retorted to as the first sub ring gear) 32A and is axially adjacent therewith to commonly mesh with the sub planet gear 33A. The additional one-way clutch (hereinafter referred to as a second one-way clutch) 170 is of the identical structure to a one-way clutch (hereinafter referred to a first one-way clutch) 70A. The main planetary gear train is composed era like main sun gear 21A connected to a rotor shaft 2A of the motor 1, a main ring gear 22A, and main planet gears 23A meshing with the main sun gear 21A and the main ring gear 22A, as shown in FIG. 12. The main ring gear 22A is formed on its outer periphery with circumferentially spaced projections 24A which are engageable with stoppers 61A of a lock member 60A. The lock member 60A is slidably supported to the case 10A to be axially movable between a lock position of engaging the stoppers 61A with the projections 24A to rotatively fix the main ring gear 21A and a release position of disengaging the stoppers 61A from the projections 24A to permit the main ring gear 22A to freely rotate. The lock member 60A, is urged by a spring 65 to the lock position and is displaced to the release position against the spring bias when the lead applied to the output shaft 5A and therefore to the main ring gear 22A exceeds a predetermined level.

Figure 15B:
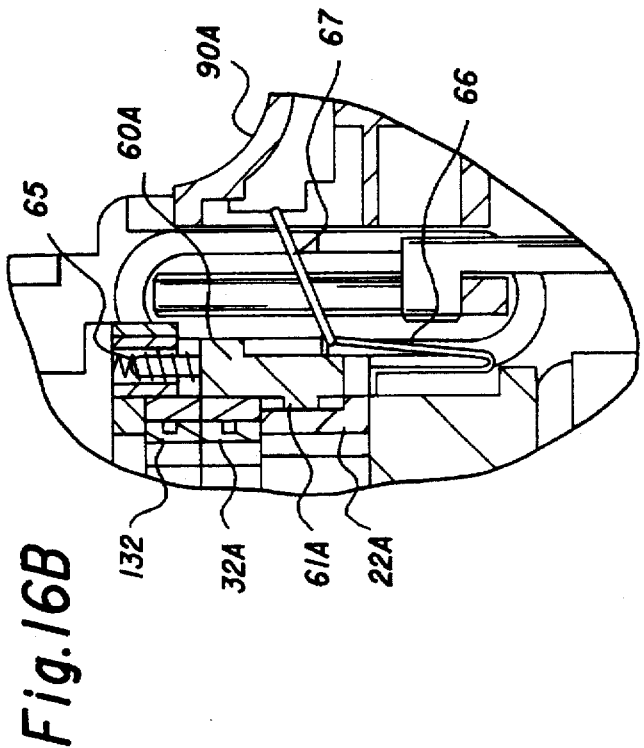
Figure 15A:
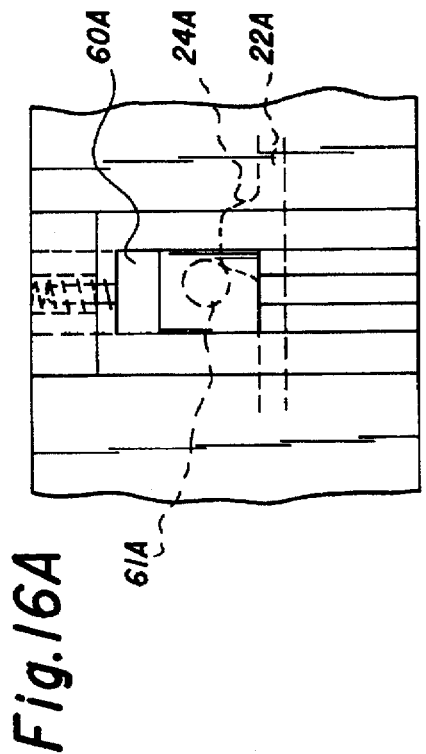
Figure 16B:
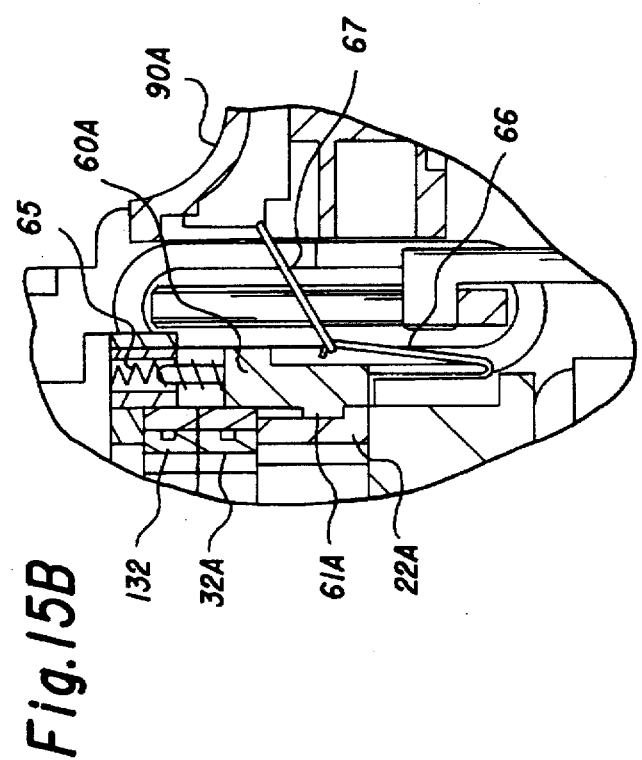
Figure 16A:
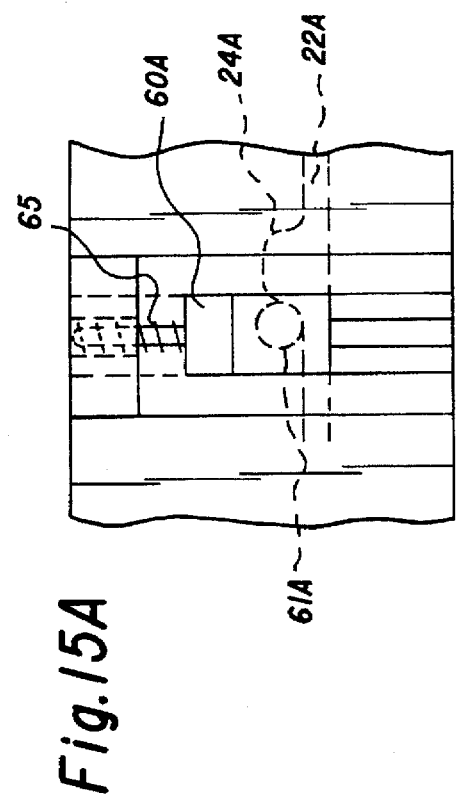
Figure 17B:
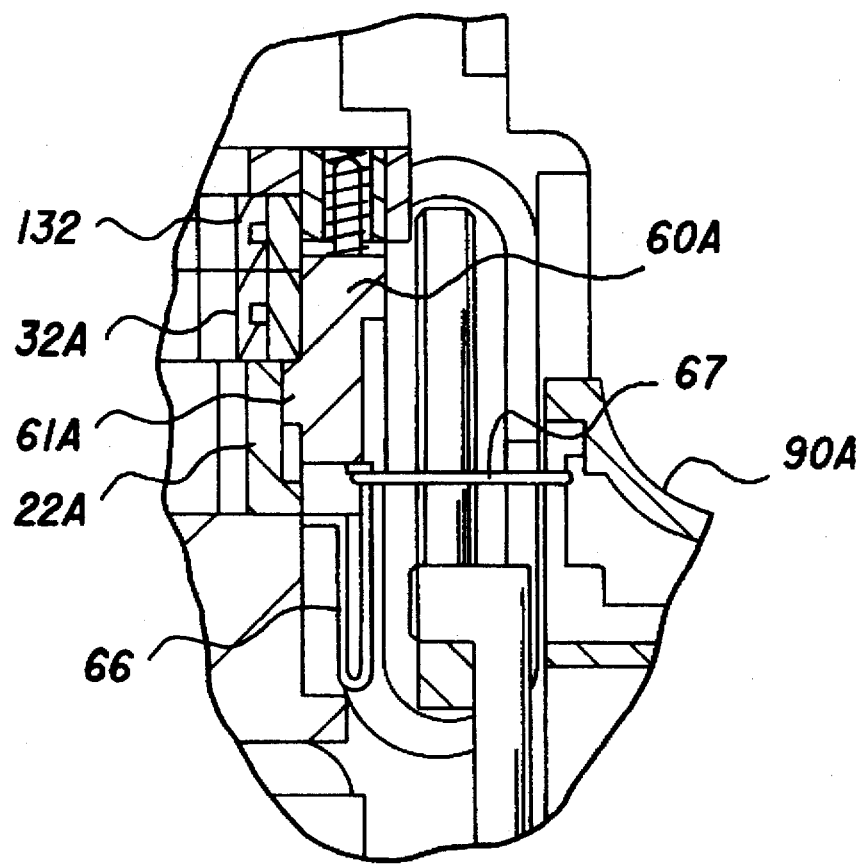
Figure 17A:
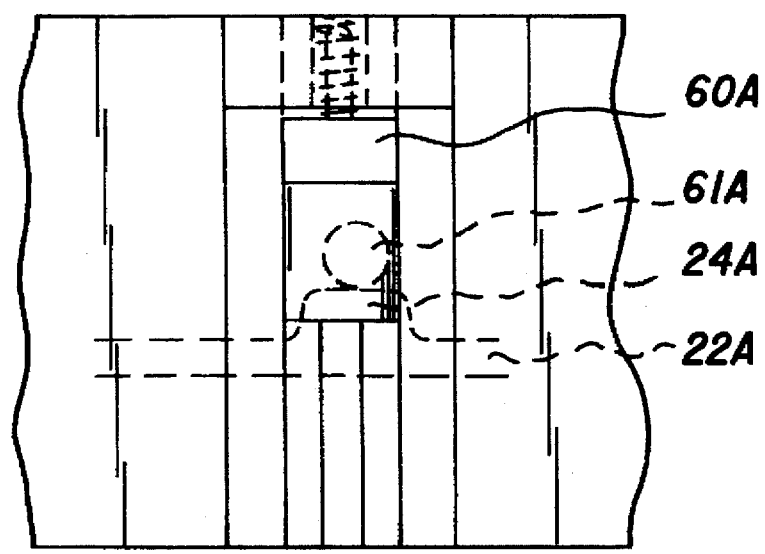

As shown in FIGS. 15A, 16A, and 17A, the stopper 61A of the lock member 60A is of a circular configuration so that it can ride up an incline of the projection 24A of the main ring gear 22A to displace the lock member 60A into the release position when the main ring gear 22A is forced to rotate in response to the excessive lead applied to the main ring gear 22A. Upon this occurrence, the main planetary gear train is made inactive and the sub planetary gear train becomes active in the same manner as in the first embodiment to drive the output shaft 5A at different speed reduction ratio, i.e., at a lower speed with higher torque than when the main planetary gear train is active. Upon moving to the release position, the lock member 60A is latched in this position by means of a latch spring 66 until the motor 1 is stopped by releasing a trigger 90A. As shown in FIGS. 15B, 16B, and 17B, the latch spring 66 is linked to the trigger 90A by means of a reset handle 67 in such a manner that the latch spring 66 is allowed to latch the lock member 60A in the release position only when the trigger 90A is fully pressed, as shown in FIG. 17B, to energize the motor for operating the power tool. That is, when the lock member 60A is moved to the release position while the trigger 90A is pressed, the latch spring 66 is allowed to deform by itself to engage the upper end thereof with the lower end of the lock member 60A. When the trigger 90A is released to stop operating the power tool, the reset handle 67 is correspondingly moved to pull the latch spring 66 in a direction of disengaging it from the lock member 60A, whereby the lock member 60A returns by the urgency of the spring 65 to lock position of FIG. 15B.

Turning back to FIG. 10, the sub planetary gear train comprises a sub sun gear 31A, first and second sub ring gears 32A and 132, and sub planet gears 33A meshing with the sub sun gear and the first and second sub ring gears. The sub sun gear 31A is rotatively fixed to the main sun gear 21A to be driven to rotate together by the motor 1. The sub planet gears 33A and the main planet gears 23A are supported to a common carrier 40A which is drivingly connected to drive the output shaft 5A through another planetary gear train composed of a sun wheel 41A, fixed ring wheel 42A, and planet wheels 43A. The sun wheel 41A is integral with the carrier 40A of the sub planetary gear train and the planet wheels 43 are supported to a carrier 44A fixed to the output shaft 5A.

Figure 13:
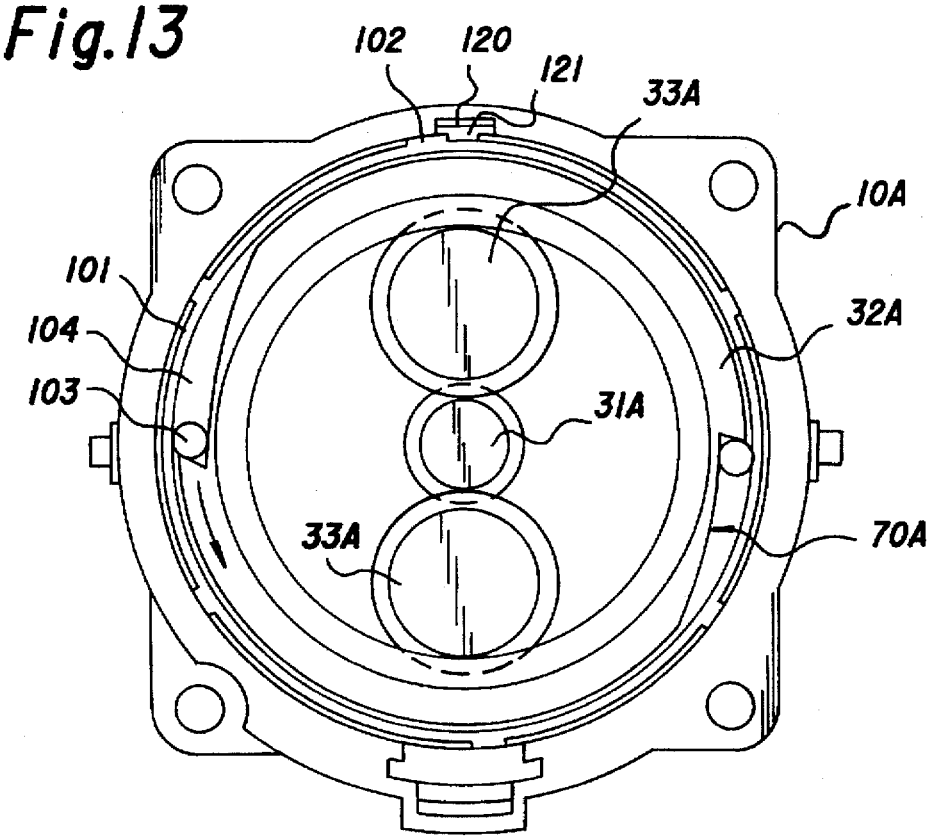
FIG. 13 is a cross section substantially taken along line D—D of FIG. 10.
Figure 14:
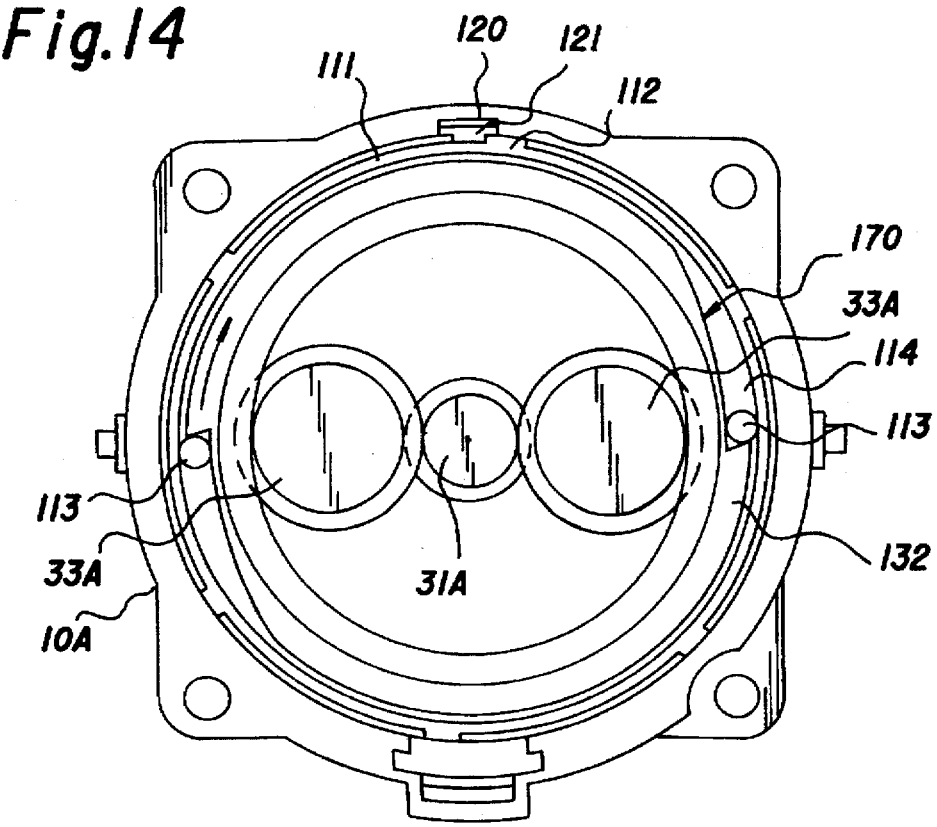
FIG. 14 is a cross section substantially taken along line E—E of FIG. 11.

As shown in FIG. 13, the first one-way clutch 70A comprises a first inner race defined by the first sub ring gear 32A, a first outer race 101, and rollers 103 held respectively in two diametrically opposed spaces 104 formed between the inner and outer race. The space 104 are configured to have a narrowing gap in one circumferential direction to define a release end and a lock end at the opposite circumferential ends of the space. The release end has a gap greater than the diameter of the roller 103, while the lock end has a gap smaller than the diameter of the roller 103. The roller 103 is received in the space to be movable between the release and lock ends in the direction depending upon the rotating direction of the inner race, i.e., the first ring gear 32A. When the inner race 32A rotates in the direction indicated by a solid arrow in FIG. 13, the roller 103 is moved to the release end of the space, thereby allowing the inner race 32A to rotate freely from the outer race 101. When, on the other hand, the inner race 32A rotates in the opposite direction, the roller 103 is moved to the lock end to fix the inner race 32A to the outer race 101. The outer race 101 is formed on its outer surface with circumferentially spaced teeth 102 engageable with a latch 121 of a selector 120 which is supported to the case 10A to be axially movable. When the selector 120 is axially moved to engage the latch 121 to the tooth 102 of the outer race 101, the outer race 101 is fixed to the case 10A so that the inner race, i.e., the first sub ring gear 32A is allowed to rotate only in one direction and prohibited to rotate in the other direction. The second one-way clutch 170 is of the identical configuration to the first one-way clutch but permits the rotation in the opposite direction. As shown in FIG. 14, the comprises a second inner race defined by the second sub ring gear 132, a second outer race 111, and rollers 113 received in the like spaces 114. The outer race 111 is formed with like teeth 112 engageable with the latch 121 of the selector 120. The inner race 132 of the second one-way clutch is disposed oppositely to that of the one-way clutch with regard to the circumferential direction so that, when the outer race 111 is fixed to the case 10A, the inner race 132 is permitted to rotate in the direction which, as indicated by an solid arrow in FIG. 15, is opposite to the permitted direction by the first one-way clutch. The selector 120 operates to selectively fix the outer race of one of the first and second one-way clutches depending upon the rotating direction of the motor so as to make active the one the first and second clutches while inactivating the other. For example, when the first one-way clutch is activated by engaging the selector 120 with the first outer race 101, as shown in FIG. 10, the second one-way clutch is made inactive to allow the inner race, i.e., the second sub ring gear 132 to freely rotate in either directions with or without the outer race 111. When, on the other hand, the second one-way clutch is activated by engaging the selector 120 with the second outer race 111, the first one-way clutch is disengaged from the sub planetary gear train so that the first sub ring gear 32A is free to rotate in either directions.

Also in this embodiment, when the lock member 60A moves to the release position of inactivating the main planetary gear train is made inactive in response to the excessive load applied to the output shaft, the one of the first and second one-way clutches selected in accordance with the rotating direction of the motor is actuated to make active the sub planetary gear train to thereby continue driving the output shaft 5A at the low speed with high torque determined by the sub planetary gear train. When reversing the motor, the selector 120 is correspondingly actuated to activate the other of the first and second one-way clutches. In this connection, the selector is preferred to be interlocked with a switch mechanism of changing the rotating direction of the motor.

The lock member 60A may be connected to a manual handle (not shown) so that it is moved manually between the lock position of activating the main planetary gear train and the release position of activating the sub planetary gear train. In this case, the lock member 60A may be configured to move between these positions only by the manual handle.

Figure 18A:
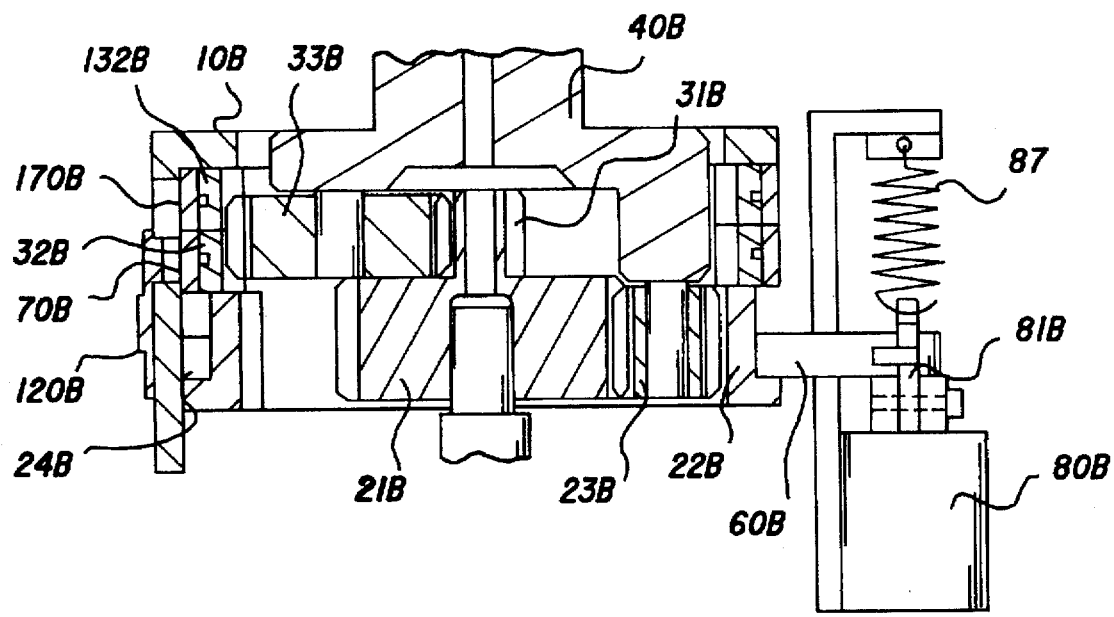
FIGS. 18A and 18B are partial sectional views illustrating operation of a modification of the second embodiment.
Figure 18B:
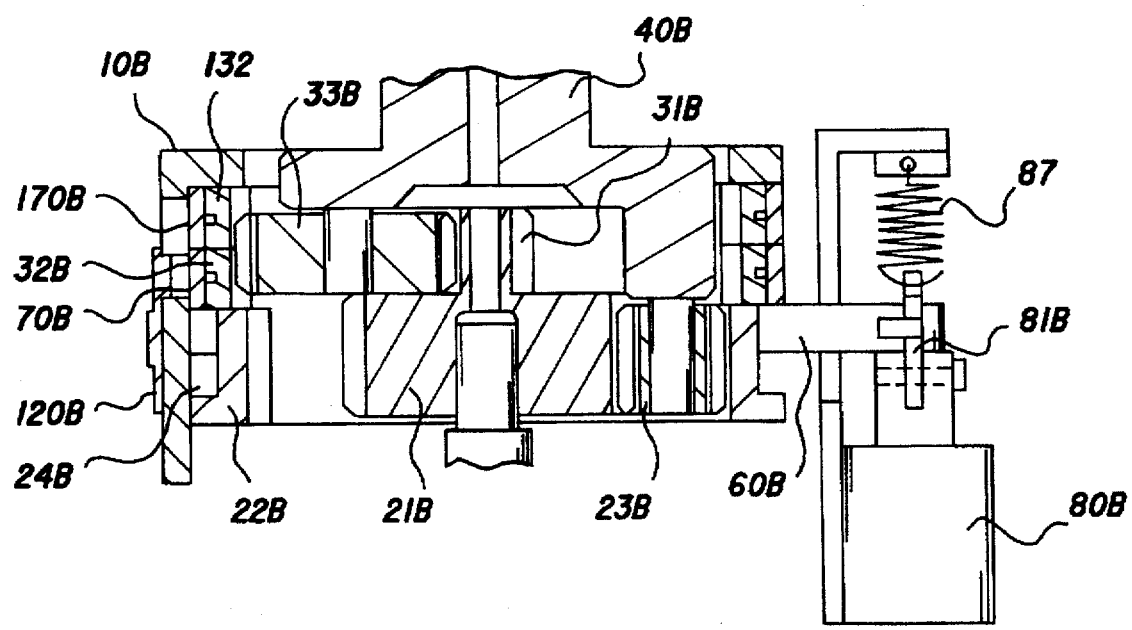

FIGS. 18A and 18B illustrate a modification of the second embodiment which is identical in structure and operation to the second embodiment except that a keep solenoid 80B is provided to move a lock member 60B from the lock position to the release position upon the load applied to the motor exceeding a predetermined level. Like parts are designated by like numerals with a suffix letter of "B". The keep solenoid 80B comprises a plunger 81B connected to move the lock member 60B and a permanent magnet (now shown) which attracts the plunger in the retracted position of FIG. 18A in which the lock member 60B engages with the projection 24B of the main ring gear 22B to activate the main planetary gear train for driving the output shaft at the high speed with low torque. A tension spring 87 is connected to urge the plunger 81B in the extended position of FIG. 18B in which the lock member 60B is disengaged from the projection 24B of the main ring gear 22B to activate the sub planetary gear train for driving the output shaft at the low speed with high torque. The plunger 81B is normally held in the position of FIG. 18A against the bias of the spring 87 by the attraction force of the permanent magnet. The keep solenoid 80B is connected in circuit with a lead monitor for monitoring a motor current as representative of the lead being applied to the motor, i.e., the output shaft and is energized in response to the lead monitor acknowledging the lead exceeding a predetermined level. Upon this occurrence, the resulting electromagnetic force is additive to the spring bias to overcome the attraction force from the permanent magnet, thereby moving the plunger 81B and therefore lock member 60B to the release position and holding the plunger 81B in this position by the tension force of the spring 87 until the plunger 81B is reset to the retracted position. In this connection, the plunger 81B is preferably linked to a trigger of powering the motor such that the lock member 60B is reset to the lock position before the trigger is pressed to start powering the motor, in the manner as described with reference to the first embodiment.

What is claimed is:

1. A planetary gear transmission system, comprising:

a main planetary gear train composed of a main sun gear (21), a main hollow gear (22) coaxial with said main sun gear, and main planet gears (23) meshing with said main sun gear and said main hollow gear, said main sun gear having means for direct connection to an input rotary shaft (2) of an electric motor to rotate;

a sub planetary gear train composed of a sub sun gear (31), a sub hollow gear (32) coaxial with said sub sun gear, and sub planet gears (33) meshing with said sub sun gear and said sub hollow gear and having a different gear ratio than said main planetary gear train, said sub sun gear connected to said main sun gear to rotate together therewith;

a common carrier (40) supporting said main and sub planet gears (23, 33) and rotatable about a common center axis of said main and sub sun gears (21, 31), said common carrier adapted in use to be drivingly connected to an output shaft (5);

lock means (60, 61) for locking said main hollow gear and releasing the same, wherein said main planetary gear train has a lower reduction ratio than the sub planetary gear train; and first one-way clutch means (70) which is connected to said sub hollow gear (32) to permit said sub hollow gear to rotate in a first direction and to prohibit said sub hollow gear from rotating in a second direction opposite to said first direction, said first direction being selected to be a direction in which said sub hollow gear (32) is permitted to rotate during said common carrier (40) rotates, while said main hollow gear (22) is fixed by said lock means, such that said sub hollow gear (32) is locked in said second direction after said main hollow gear (22) is released to thereby permit said common carrier (40) to continue rotating at a speed reduction ratio different than when said main hollow gear is fixed.

2. A planetary gear transmission system as set forth in claim 1, wherein said one-way clutch means (70) includes direction switch means (73, 77) for switching said first and second directions.

3. A planetary gear transmission system as set forth in claim 2, wherein said one-way clutch means (70) comprises a fixed outer race (10), an inner race integral with said sub hollow gear (32), and a roller (71) received in each one of first and second compartments (74, 75) formed to extend circumferentially between said outer and inner races, and wherein said direction switch means comprises a switch member (73) for displacing said rollers (71) circumferentially in said first and second compartments (74, 75) between a first position and a second position, said first and second compartments having varying gap between said inner and outer races to define a lock end in one of circumferential ends of each compartment and a release end in the other circumferential end thereof, said lock ends of said first and second compartments opposing to each other in the circumferential direction, said lock end having a gap smaller than the diameter of said roller (71) and said release end having a gap greater than the diameter of said roller (71), said roller movable circumferentially in each compartment (74, 75) and urged towards said lock end such that said roller (71) in said first compartments (74) is displaced into said lock end to permit said inner race (32) to rotate only in said first direction when said switch member (73) is moved to said first position, and that said roller (71) in said second compartment (75) is displaced into said lock end to permit said inner face (32) to rotate only in said second direction when said switch member (73) is moved to said second position.

4. A planetary gear transmission system as set forth in claim 3, wherein said first and second compartments (74, 75) are formed as a continuous space between said outer race (10) and said inner race (32) and separated by said switch member (73) received in said space, said rollers (71) in said first and second compartments (74, 75) being urged against said switch member (73).

5. A planetary gear transmission system as set forth in claim 1, further comprising an additional sub hollow gear (132) meshing with said sub planet gears (33A) in a coaxial relation with said sub hollow gear (32A); and second one-way clutch means (170), which is connectable to said additional sub hollow gear (132) to permit said additional sub ring to rotate only in the second direction, wherein selector means (120) is provided to selectively actuate said first and second one-way clutch means.

6. A planetary gear transmission system as set forth in claim 1, wherein said lock means (60, 61; 60A, 61A) is movable from a lock position of fixing said main hollow gear (22, 22A) to a release position of releasing said main hollow gear, said lock means being actuated to move into said release position in response to said main hollow gear receiving a load which exceeds a predetermined level.

7. A planetary gear transmission system as set forth in claim 1, wherein said lock means (60, 61) is movable from a lock position of fixing said main hollow gear (22) to a release position of releasing said main hollow gear, and a release handle is connected to manually move said lock means into said release position.

8. A planetary gear transmission system as set forth in claim 1, wherein said lock means (60, 61) is movable from a lock position of fixing said main hollow gear (32) to a release position of releasing said main hollow gear, and an electromagnetic actuator (80) is connected to move said lock means into said release position in response to an electric signal.

9. A planetary gear transmission system as set forth in claim 8, wherein said electromagnetic actuator comprises a keep solenoid (80) with a plunger (81) connected to move said lock means (60), said keep solenoid actuated by an application of an electric current to move said lock means into said release position and holding said lock means in said lock position in the absence of the electric current.

10. A planetary gear transmission system as set forth in claim 9, wherein said keep solenoid (80) includes a permanent magnet attracting said plunger (81) in the direction of holding said lock means in said lock position, and wherein spring means (82) is connected to urge said plunger in the direction of moving said lock means to said release position against the magnetic attraction of said permanent magnet and holds said lock means in said release position after said lock means moves to said release position from said lock position.

11. A planetary gear transmission system as set forth in claim 9, wherein said keep solenoid (80) includes a permanent magnet attracting said plunger (81) in the direction of moving said lock means in said release position, and wherein spring means is connected to urge said plunger in the direction of moving said lock means to said lock position, said keep solenoid acting when energized by an electric current to actuate said plunger against the bias of said spring means in the direction of moving said lock means towards the release position in which said plunger is held in position by the attraction of the said permanent magnet.

12. A planetary gear transmission system as set forth in claim 9, wherein said carrier (40) rotates at a lower speed reduction ratio when said lock means is at said lock position of fixing said main hollow gear (22) than when said lock means is moved to said release position of releasing said main hollow gear to correspondingly fix said sub hollow gear (32), and wherein said keep solenoid (80) is connected to a return handle (83) by which said lock means is manually operated to move from said release position to said lock position.

13. A planetary gear transmission system as set forth in claim 12, wherein said keep solenoid (80) is actuated to move said lock means (60, 61) from said lock position to said release position in response to said output shaft (5) receiving a load which exceeds a predetermined level, and wherein said return handle (83) is connected to a trigger (90) of a power tool incorporating said system so that said return handle (83) is actuated to return said lock means back to said lock position each time said trigger (90) is actuated to operate said power tool.

14. A planetary gear transmission system as set forth in claim 1, wherein said one-way clutch means (70) comprises a fixed outer race (10), an inner race integral with said sub hollow gear (32), and a roller (71) held between said outer and inner races to allow said inner race to rotate only in said first direction, said outer race being formed as a part of a gear casing (10) incorporating said main and sub planetary gear trains, and said inner race defining itself said sub hollow gear (32).

15. A planetary gear transmission system, comprising:

a main planetary gear train composed of a main sun gear, a main ring gear coaxial with said main sun gear, and main planet gears meshing with said main sun gear and said main ring gear, said main sun gear adapted in use to be connected to an input rotary shaft to be driven thereby to rotate;

a sub planetary gear train composed of a sub sun gear, a sub ring gear coaxial with said sub sun gear, and sub planet gears meshing with said sub sun gear and said sub ring gear and having a different gear ratio than said main planetary gear train, said sub sun gear connected to said main sun gear to rotate together therewith;

a common carrier supporting said main and sub planet gears and rotatable about a common center axis of said main and sub sun gears, said common carrier adapted in use to be drivingly connected to an output shaft;

lock means for releasably fixing said main ring gear;

first one-way clutch means, connected to said sub ring gear for permitting said sub ring gear to rotate in a first direction and for preventing said sub ring gear from rotating in a second direction opposite to said first direction, said first direction being selected to be a direction in which said sub ring gear is permitted to rotate during said common carrier rotation with said main ring gear fixed by said lock means, such that said sub ring gear is locked in said second direction after said main ring gear is released to thereby permit said common carrier to continue rotating at a speed reduction ratio different than when said main ring gear is fixed;

an additional sub ring gear meshing with said sub planet gears in a coaxial relation with said sub ring gear; and second one-way clutch means which is connectable to said additional sub ring gear to permit said additional sub ring to rotate only in the second direction, wherein selector means is provided to selectively actuate said first and second one-way clutch means.

16. A planetary gear transmission system, comprising:

a main planetary gear train composed of a main sun gear, a main ring gear coaxial with said main sun gear, and main planet gears meshing with said main sun gear and said main ring gear, said main sun gear adapted in use to be connected to an input rotary shaft to be driven thereby to rotate;

a sub planetary gear train composed of a sub sun gear, a sub ring gear coaxial with said sub sun gear, and sub planet gears meshing with said sub sun gear and said sub ring gear and having a different gear ratio than said main planetary gear train, said sub sun gear connected to said main sun gear to rotate together therewith;

a common carrier supporting said main and sub planet gears and rotatable about a common center axis of said main and sub sun gears, said common carrier adapted in use to be drivingly connected to an output shaft;

lock means for releasably fixing said main ring gear; and first one-way clutch means, connected to said sub ring gear for permitting said sub ring gear to rotate in a first direction and for preventing said sub ring gear from rotating in a second direction opposite to said first direction, said first direction being selected to be a direction in which said sub ring gear is permitted to rotate during said common carrier rotation with said main ring gear fixed by said lock means, such that said sub ring gear is locked in said second direction after said main ring gear is released to thereby permit said common carrier to continue rotating at a speed reduction ratio different than when said main ring gear is fixed, wherein said lock means is movable from a lock position of fixing said main ring gear to a release position of releasing said main ring gear, said lock means being actuated to move into said release position in response to said main ring gear receiving a load which exceeds a predetermined level.

17. A planetary gear transmission system, comprising:

a main planetary gear train composed of a main sun gear, a main ring gear coaxial with said main sun gear, and main planet gears meshing with said main sun gear and said main ring gear, said main sun gear adapted in use to be connected to an input rotary shaft to be driven thereby to rotate;

a sub planetary gear train composed of a sub sun gear, a sub ring gear coaxial with said sub sun gear, and sub planet gears meshing with said sub sun gear and said sub ring gear and having a different gear ratio than said main planetary gear train, said sub sun gear connected to said main sun gear to rotate together therewith;

a common carrier supporting said main and sub planet gears and rotatable about a common center axis of said main and sub sun gears, said common carrier adapted in use to be drivingly connected to an output shaft;

lock means for releasably fixing said main ring gear; and first one-way clutch means, connected to said sub ring gear for permitting said sub ring gear to rotate in a first direction and for preventing said sub ring gear from rotating in a second direction opposite to said first direction, said first direction being selected to be a direction in which said sub ring gear is permitted to rotate during said common carrier rotation with said main ring gear fixed by said lock means, such that said sub ring gear is locked in said second direction after said main ring gear is released to thereby permit said common carrier to continue rotating at a speed reduction ratio different than when said main ring gear is fixed, wherein said lock means is movable from a lock position of fixing said main ring gear to a release position of releasing said main ring gear, and release handle is connected to manually move said lock means into said release position.

18. A planetary gear transmission system, comprising:

a main planetary gear train composed of a main sun gear, a main ring gear coaxial with said main sun gear, and main planet gears meshing with said main sun gear and said main ring gear, said main sun gear adapted in use to be connected to an input rotary shaft to be driven thereby to rotate;

a sub planetary gear train composed of a sub sun gear, a sub ring gear coaxial with said sub sun gear, and sub planet gears meshing with said sub sun gear and said sub ring gear and having a different gear ratio than said main planetary gear train, said sub sun gear connected to said main sun gear to route together therewith;

a common carrier supporting said main and sub planet gears and rotatable about a common center axis of said main and sub sun gears, said common carrier adapted in use to be drivingly connected to an output shaft;

lock means for releasably fixing said main ring gear; and first one-way clutch means, connected to said sub ring gear for permitting said sub ring gear to rotate in a first direction and for preventing said sub ring gear from routing in a second direction opposite to said first direction, said first direction being selected to be a direction in which said sub ring gear is permitted to rotate during said common carrier rotation with said main ring gear fixed by said lock means, such that said sub ring gear is locked in said second direction after said main ring gear is released to thereby permit said common carrier to continue rotating at a speed reduction ratio different than when said main ring gear is fixed, wherein said lock means is movable from a lock position of fixing said main ring gear to a release position of releasing said main ring gear, and an electromagnetic actuator is connected to move said lock means into said release position in response to an electric signal.

19. A planetary gear transmission system as set forth 18, wherein said electromagnetic actuator comprises a keep solenoid with a plunger connected to move said lock means, said keep solenoid actuated by an application of an electric current to move said lock means into said release position and holding said lock means in said lock position in the absence of the electric current.

20. A planetary gear transmission system as set forth in claim 19, wherein said keep solenoid includes a permanent magnet attracting said plunger in the direction of holding said lock means in said lock position, and wherein spring means is connected to urge said plunger in the direction of moving said lock means to said release position against the magnetic attraction of said permanent magnet and holds said lock means in said release position after said lock means moves to said release position from said lock position.

21. A planetary gear transmission system as set forth in claim 19, wherein said keep solenoid includes a permanent magnet attracting said plunger in the direction of moving said lock means in said release position, and wherein spring means is connected to urge said plunger in the direction of moving said lock means to said lock position, said keep solenoid acting when energized by an electric current to actuate said plunger against the bias of said spring means in the direction of moving said lock means towards the release position in which said plunger is held in position by the attraction of the said permanent magnet.

22. A planetary gear transmission system as set forth in claim 19, wherein said carrier rotates at a lower speed reduction ratio when said look means is at said lock position of fixing said main ring gear than when said lock means is moved to said release position of releasing said main ring gear to correspondingly fix said sub ring gear, and wherein said keep solenoid is connected to a return handle by which said look means is manually operated to move from said release position to said lock position.

23. A planetary gear transmission system as set forth in claim 22, wherein said keep solenoid is actuated to move said lock means from said lock position to said release position in response to said output shaft receiving a load which exceeds a predetermined level, and wherein said return handle is connected to a trigger of a power tool incorporating said system so that said return handle is actuated to return said lock means back to said lock position each time said trigger is actuated to operate said power tool.

24. A planetary gear transmission system, comprising: a main planetary gear train composed of a main sun gear, a main ring gear coaxial with said main sun gear, and main planet gears meshing with said main sun gear and said main ring gear, said main sun gear adapted in use to be connected to an input rotary shaft to be driven thereby to rotate;

a sub planetary gear train composed of a sub sun gear, a sub ring gear coaxial with said sub sun gear, and sub planet gears meshing with said sub sun gear and said sub ring gear and having a different gear ratio than said main planetary gear train, said sub sun gear connected to said main sun gear to rotate together therewith;

a common carrier supporting said main and sub planet gears and rotatable about a common center axis of said main and sub sun gears, said common carrier adapted in use to be drivingly connected to an output shaft;

lock means for releasably fixing said main ring gear; and first one-way clutch means, connected to said sub ring gear for permitting said sub ring gear to rotate in a first direction and for preventing said sub ring gear from rotating in a second direction opposite to said first direction, said first direction being selected to be a direction in which said sub ring gear is permitted to rotate during said common carrier rotation with said main ring gear fixed by said lock means, such that said sub ring gear is locked in said second direction after said main ring gear is released to thereby permit said common carrier to continue rotating at a speed reduction ratio different than when said main ring gear is fixed, wherein said one-way clutch means comprises a fixed outer race, an inner race integral with said sub ring gear, and a roller held between said outer and inner races to allow said inner race to rotate only in said first direction, said outer race being formed as part of a gear casing incorporating said main and sub planetary gear trains, and said inner race defining itself said sub ring gear.

25. A planetary gear transmission system, comprising:
a main planetary gear train composed of a main sun gear, a main ring gear coaxial with said main sun gear, and main planet gears meshing with said main sun gear and said main ring gear, said main sun gear adapted in use to be connected to an input rotary shaft to be driven thereby to rotate;
a sub planetary gear train composed of a sub sun gear, a sub ring gear coaxial with said sub sun gear, and sub planet gears meshing with said sub sun gear and said sub ring gear having a different gear ratio than said main planetary gear train, said sub sun gear connected to said main sun gear to rotate together therewith;
a common carrier supporting said main and sub planet gears and rotatable about a common center axis of said main and sub sun gears, said common carrier adapted in use to be drivingly connected to an output shaft;
lock means for releasably fixing said main ring gear; and
first one-way clutch means, connected to said sub ring gear for permitting said sub ring gear to rotate in a first direction and for preventing said sub ring gear from rotating in a second direction opposite to said first direction, said first direction being selected to be a direction in which said sub ring gear is permitted to rotate during said common carrier rotation with said main ring gear fixed by said lock means, such that said sub ring gear is locked in said second direction after said main ring gear is released to thereby permit said common carrier to continue rotating at a speed reduction ratio different than when said main ring gear is fixed,
wherein said one-way clutch means includes direction switch means for switching said first and second directions, and
wherein said one-way clutch means comprises a fixed outer race, an inner race integral with said sub ring gear, and a roller received in each one of first and second compartments formed to extend circumferentially between said outer and inner races, and wherein said direction switch means comprises a switch member for displacing said rollers circumferentially in said first and second compartments between a first position and a second position, said first and second compartments having varying gap between said inner and outer races to define a lock end in one of circumferential ends of each compartment and a release end in the other circumferential end thereof, said lock ends of said first and second compartments opposing to each other in the circumferential direction, said lock end having a gap smaller than the diameter of said roller and said release end having a gap greater than the diameter of said roller, said roller movable circumferentially in each compartment and urged towards said lock end such that said roller in said first compartments is displaced into said lock end to permit said inner race to rotate only in said first direction when said switch member is moved to said first position, and that said roller in said second compartment is displaced into said lock end to permit said inner face to rotate only in said second direction when said switch member is moved to said second position.

26. A planetary gear transmission system as set forth in claim 25, wherein said main and sub planetary gear trains are configured such that said carrier rotates at a higher speed reduction ratio with said sub ring gear being fixed than with said main ring gear being fixed.

27. A planetary gear transmission system as set forth in claim 25, wherein said first and second compartments are formed as a continuous space between said outer race and said inner race and separated by said switch member received in said space, said rollers in said first and second compartments being urged against said switch member.

* * * * *